United States Patent
Hesford et al.

(10) Patent No.: US 10,410,508 B2
(45) Date of Patent: Sep. 10, 2019

(54) METHODS AND APPARATUS FOR SECURITY MONITORING

(71) Applicants: David Michael Hesford, Saint Johns, FL (US); Robert Johannes van Winkel, Daytona Beach, FL (US)

(72) Inventors: David Michael Hesford, Saint Johns, FL (US); Robert Johannes van Winkel, Daytona Beach, FL (US)

( * ) Notice: Subject to any disclaimer, the term of this patent is extended or adjusted under 35 U.S.C. 154(b) by 0 days.

(21) Appl. No.: 16/358,796

(22) Filed: Mar. 20, 2019

(65) Prior Publication Data

US 2019/0221104 A1 Jul. 18, 2019

Related U.S. Application Data

(63) Continuation-in-part of application No. 15/655,033, filed on Jul. 20, 2017, now Pat. No. 10,262,521.

(60) Provisional application No. 62/493,966, filed on Jul. 23, 2016.

(51) Int. Cl.
   *G08B 25/00* (2006.01)
   *H04W 4/029* (2018.01)
   *G08B 25/01* (2006.01)

(52) U.S. Cl.
   CPC ......... *G08B 25/005* (2013.01); *G08B 25/008* (2013.01); *G08B 25/014* (2013.01); *H04W 4/029* (2018.02)

(58) Field of Classification Search
   CPC .. G08B 25/001; G08B 25/005; G08B 25/009; G08B 25/014; G08B 25/10; G08B 29/02
   See application file for complete search history.

(56) References Cited

U.S. PATENT DOCUMENTS

| | | | | |
|---|---|---|---|---|
| 6,972,676 B1* | 12/2005 | Kimmel | ........... | G08B 13/19608 340/3.1 |
| 7,956,735 B2* | 6/2011 | Jackson | ........... | G08B 13/19656 340/506 |
| 8,494,481 B1* | 7/2013 | Bacco | ................ | G08B 25/005 455/404.1 |
| 8,525,664 B2* | 9/2013 | Hadizad | ................ | H04L 1/188 340/505 |
| 9,013,294 B1 | 4/2015 | Trundle | | |
| 9,900,332 B2 | 2/2018 | Muddu et al. | | |
| 2004/0113770 A1 | 6/2004 | Falk et al. | | |
| 2005/0151640 A1* | 7/2005 | Hastings | ................ | A61B 5/411 340/539.11 |
| 2009/0274104 A1* | 11/2009 | Addy | .................... | H04M 11/04 370/329 |
| 2011/0065414 A1 | 3/2011 | Frenette et al. | | |
| 2013/0154823 A1 | 6/2013 | Ostrer et al. | | |
| 2013/0249688 A1 | 9/2013 | Nguyen et al. | | |
| 2013/0250080 A1 | 9/2013 | Farrell et al. | | |

(Continued)

*Primary Examiner* — Hirdepal Singh
(74) *Attorney, Agent, or Firm* — Joseph P. Kincart; Rogers Towers, P.A.

(57) ABSTRACT

The present disclosure relates to a system and methods for monitoring an electronic device with an alarm state and responding to an alarm state on the device based upon a location of a respondent and more specifically, the present invention includes monitoring a security or intrusion detection system and communicating via an IP network to a controller with a user defined profile of responses. The present invention also includes a method of using a security unit on an ad hoc basis, rather than requiring a built-in alarm system.

20 Claims, 19 Drawing Sheets

(56) References Cited

U.S. PATENT DOCUMENTS

| | | |
|---|---|---|
| 2015/0325107 A1* | 11/2015 | Poder .................. G08B 25/001 340/506 |
| 2016/0232778 A1 | 8/2016 | Honjo et al. |
| 2016/0300465 A1 | 10/2016 | Britton et al. |
| 2017/0076562 A1 | 3/2017 | Hicks |
| 2018/0070222 A1 | 3/2018 | Narang et al. |
| 2019/0114905 A1* | 4/2019 | Raji ..................... G06F 1/3275 |

* cited by examiner

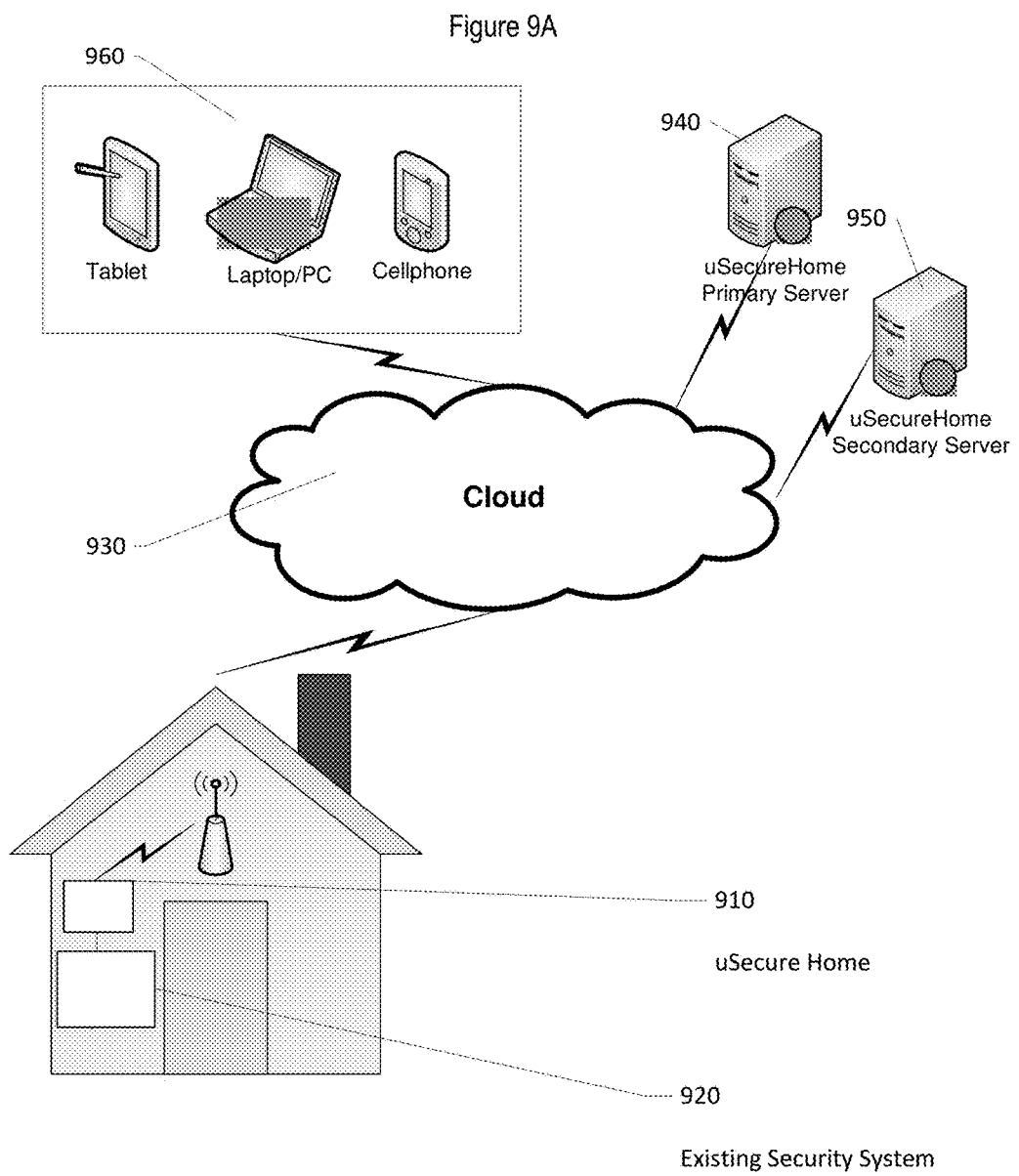

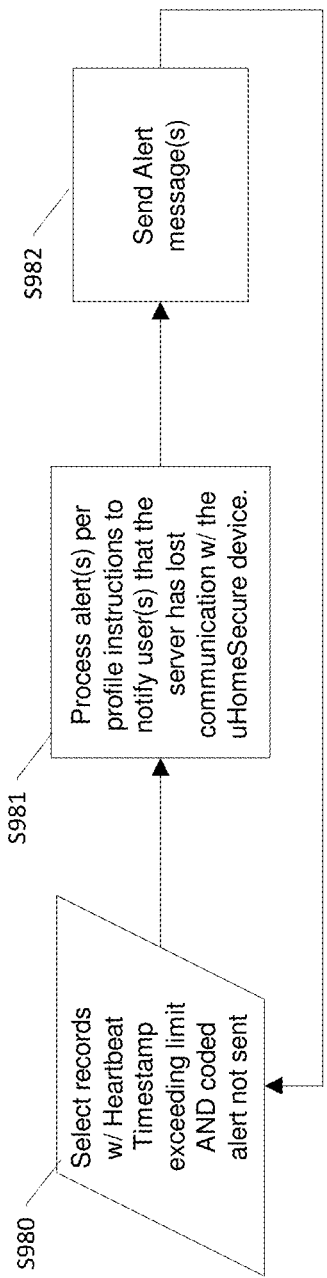

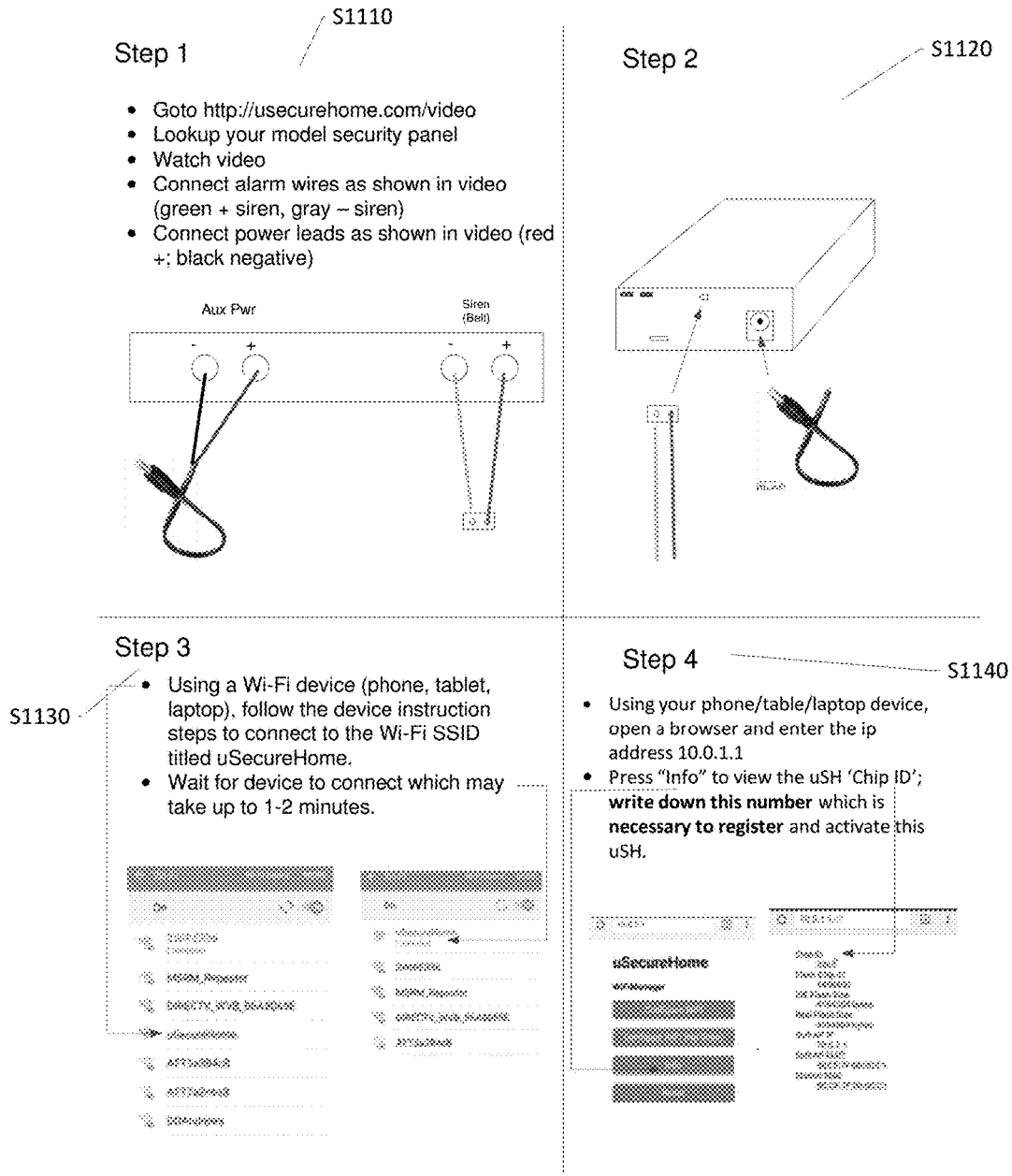

METHODS AND APPARATUS FOR SECURITY MONITORING

CROSS-REFERENCE TO RELATED APPLICATIONS

The present application claims priority to U.S. Non Provisional patent application Ser. No. 15/655,033 filed Jul. 20, 2017, entitled "Security Monitoring System and Methods," as a Continuation-in-Part Application, and also to U.S. Provisional Patent Application Ser. No. 62/493,966, filed Jul. 23, 2016, entitled "Usecurehome. Usecurebiz". The contents of each of these applications are relied upon and incorporated herein by reference.

FIELD OF THE DISCLOSURE

The present disclosure relates to apparatus and methods for monitoring an electronic device with an alarm state and responding to an alarm state on the device based upon a location of a respondent and more specifically, the present invention includes monitoring a security or intrusion detection system and communicating via an IP network to a controller with a user defined profile of responses.

BACKGROUND OF THE DISCLOSURE

It is estimated that 22 million homes and an additional 6 million businesses in the United States are equipped with some form of security or intrusion detection and/or alarm system. A number of those systems are monitored remotely by third party monitoring services. The five largest security monitoring companies account for over 10 million subscribers, at a rate of up to $600 per year, each. This ongoing operating expense should be avoided.

Moreover, third party monitoring systems suffer from certain drawbacks even when operating as intended. The third-party monitoring company employs monitors who collectively monitor all that company's clients. Those monitors may be overwhelmed by a surge in alarm states, delaying their response, and onward notification to the client. A third-party monitor may not have sufficient familiarity with each structure being monitored to make adequate use of the alarm information, absent a user's assistance. This makes the third-party monitoring solution sub-optimal for the task of remotely monitoring a security, intrusion detection, or alarm system. The present state of the art is therefore lacking.

U.S. Non Provisional patent application Ser. No. 15/655,033 (the "'033 Application") filed Jul. 20, 2017, entitled "Security Monitoring System and Methods," sought to address this shortcoming. An exemplary, non-limiting use of the '033 Application contemplates a situation in which a user (e.g., homeowner, property supervisor, etc.) has a previously installed alarm system that may not be connected to a monitoring service. Given the exorbitant costs of monitoring services, the system disclosed in the '033 Application is capable of saving users significant amounts of money and endowing unused alarm systems with purpose.

SUMMARY OF THE DISCLOSURE

The present invention includes apparatus and methods of use that are more powerful than those previously known. A user may wish to protect an area on an ad hoc basis. For example, a home may not have an installed alarm system. Alternatively, the home may be frequently entered by persons to whom the user does not want to give an alarm access code. This may include rented spaces, such as vacation rentals or Airbnb, or a real estate property that is periodically shown to potential buyers. The area to be protected may not even be a home; for example, a warehouse, a trade show space, the interior of a vehicle, a shipping container, a package, or luggage may be protected.

The present disclosure relates to apparatus and methods for monitoring an electronic device with an alarm state and responding to the alarm state based upon a location of a respondent. According to the present invention a monitoring system, such as, for example, a security or intrusion detection system communicates via an Internet Protocol ("IP") network to a controller. The controller includes user defined profile with multiple responses and multiple respondents to an alarm state.

According to some embodiments, the monitoring system that includes apparatus and methods secures a structure, such as a residence other embodiments include commercial or industrial uses and facilities. The monitoring system includes an alarm device adapted to detect a state within the building, such as an entry into the structure. Other embodiments may include a condition sensor adapted to detect motion, as by ultrasound, infrared, or machine vision, or to detect the presence of sound, for example if the structure is intended to be unoccupied and no interior sound above a certain threshold is to be expected. Still other embodiments include a condition sensor to detect a deviation in temperature within the structure from an expected normal state or a sensor affixed to a person or a pet exceeding a perimeter.

According to the present invention, automated apparatus will contact a respondent based upon a condition of the alarm state and the condition and proximity of the respective respondents as compared to a user defined profile of conditions and associated responses.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method of providing a series of user designated distributed responses based upon an alarm state, the method including. The method may also include associating an analog alarm state with a universally unique identifier. The method may also include monitoring an alarm state connector. The method may also include receiving a voltage indicative of an alarm state. The method may also include recording a time and date of receipt of the voltage indicative of an alarm state.

In another aspect, the method may also include checking for an availability of communication with a first server via a first communication modality; upon determination of availability of communication with the first server via the first communication modality, transmitting the universally unique identifier to the first server via the first communication modality with an indication of the alarm state; accessing a geospatial location associated with the universally unique identifier; upon determination of unavailability of communication with the first server via the first communication modality, checking for the availability of communication with the first server via a second communication modality; upon determination of availability of communication with the first server via the second communication modality, transmitting the universally unique identifier to the first server via the second communication modality with an indication of the alarm state; and upon determination of unavailability of communication with the first server via the first communication modality and the second communication modality, transmitting the universally unique identifier to a second server with an indication of the alarm state. Other embodiments of this aspect include corresponding computer systems, apparatus, and computer programs recorded on one or more computer storage devices, each configured to perform the actions of the methods.

Various implementations may include one or more of the following features. The method additionally including the steps of: transmitting a request for a location of a first user mobile device associated with a first responder at the time of receipt of the voltage indicative of an alarm state an alarm state, receiving a Cartesian Coordinate of the first user mobile device, calculating a distance from the geospatial location associated with the universally unique identifier to the Cartesian Coordinate of the first user mobile device, referencing a next action based upon the calculated distance from the geospatial location associated with the universally unique identifier to the Cartesian Coordinate of the first user mobile device, and executing the next action based upon the calculated distance from the Cartesian Coordinate of the first user mobile device.

A method that includes a next action based upon the calculated distance from the geospatial location associated with the universally unique identifier to the Cartesian Coordinate of the first user mobile device may include transmitting alarm state indicators to the first user mobile device. The method may additionally include a step of receiving a reset mechanism from the first user mobile device and resetting the alarm state based upon receipt of the reset mechanism.

A location of the first user mobile device may also be received at the time of receipt and of receiving a reset mechanism from the first user mobile device and storing a record indicative of the location of the first user mobile device at the time of receipt of receiving the reset mechanism. A next action based upon a calculated distance from a geospatial location associated with a universally unique identifier to the Cartesian Coordinate of the first user mobile device may include determining a backup response contact.

Determining a backup response contact may include the steps of: receiving a Cartesian Coordinate of a second user mobile device, and calculating a distance from the geospatial location associated with the universally unique identifier to the Cartesian Coordinate of the second user mobile device.

Additionally an emergency response personnel responsive to a geographical area including the geospatial location associated with the universally unique identifier may be alerted. One of the first responder and a second responder may be placed in communication with the emergency response personnel. The first responder may be placed in communication with a second responder or other specified communicant. Implementations of the described techniques may include hardware, a method or process, or computer software on a computer-accessible medium.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure:

FIGS. 9A-9C an exemplary interconnection of elements of the security monitoring system with existing security systems, the "Cloud", servers and mobile devices is illustrated along with related handshake procedures.

FIGS. 11A-11B illustrate an exemplary procedure for initializing a security monitoring system.

DETAILED DESCRIPTION

In the following sections, detailed descriptions of examples and methods of the disclosure will be given. The description of both preferred and alternative examples are exemplary only, and it is understood that to those skilled in the art that variations, modifications, and alterations may be apparent. It is therefore to be understood that the examples do not limit the broadness of the aspects of the underlying disclosure as defined by the claims.

Figure 1A:
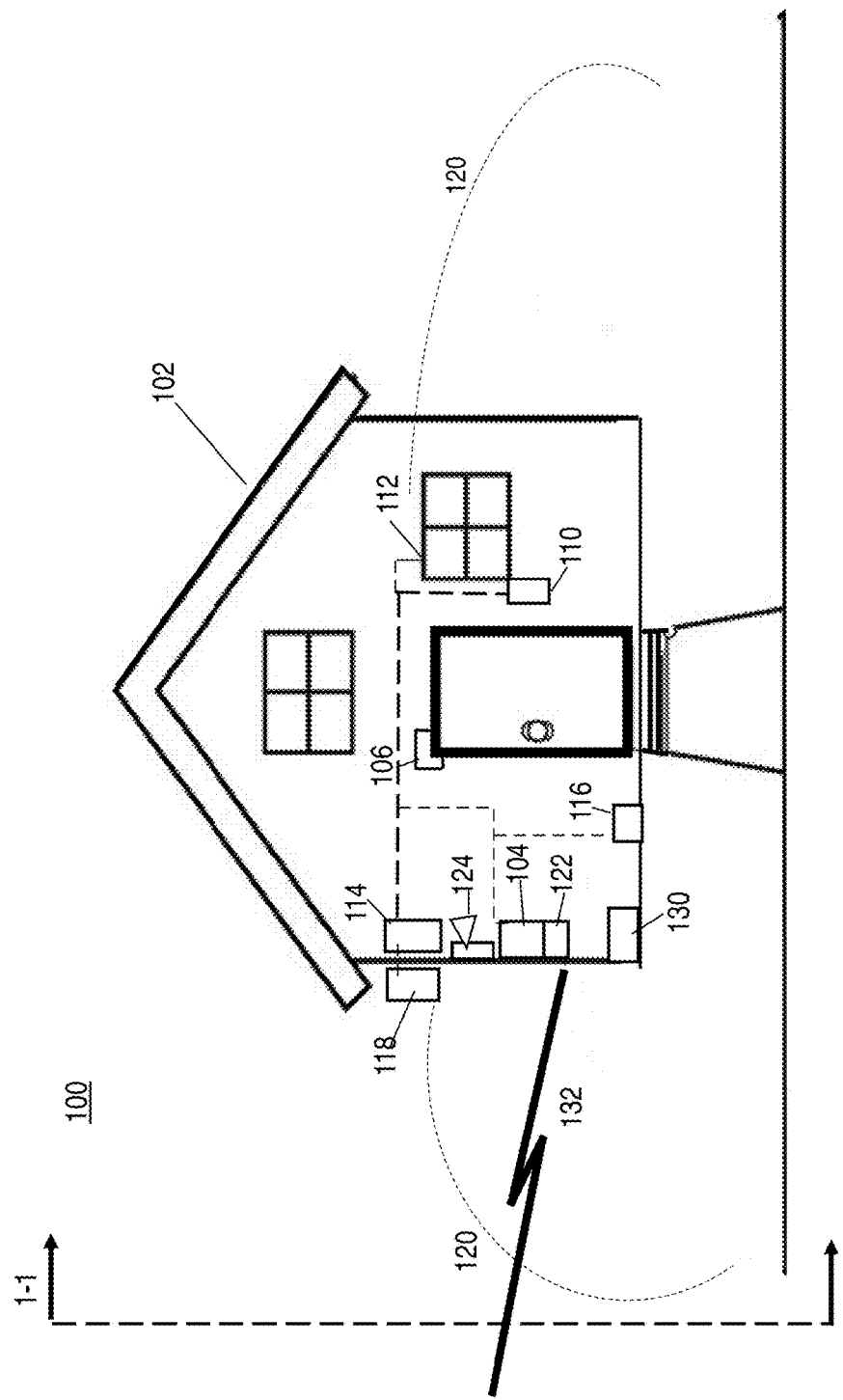
FIGS. 1A and 1B, collectively, illustrate schematically a security monitoring system for a structure.
Figure 1B:
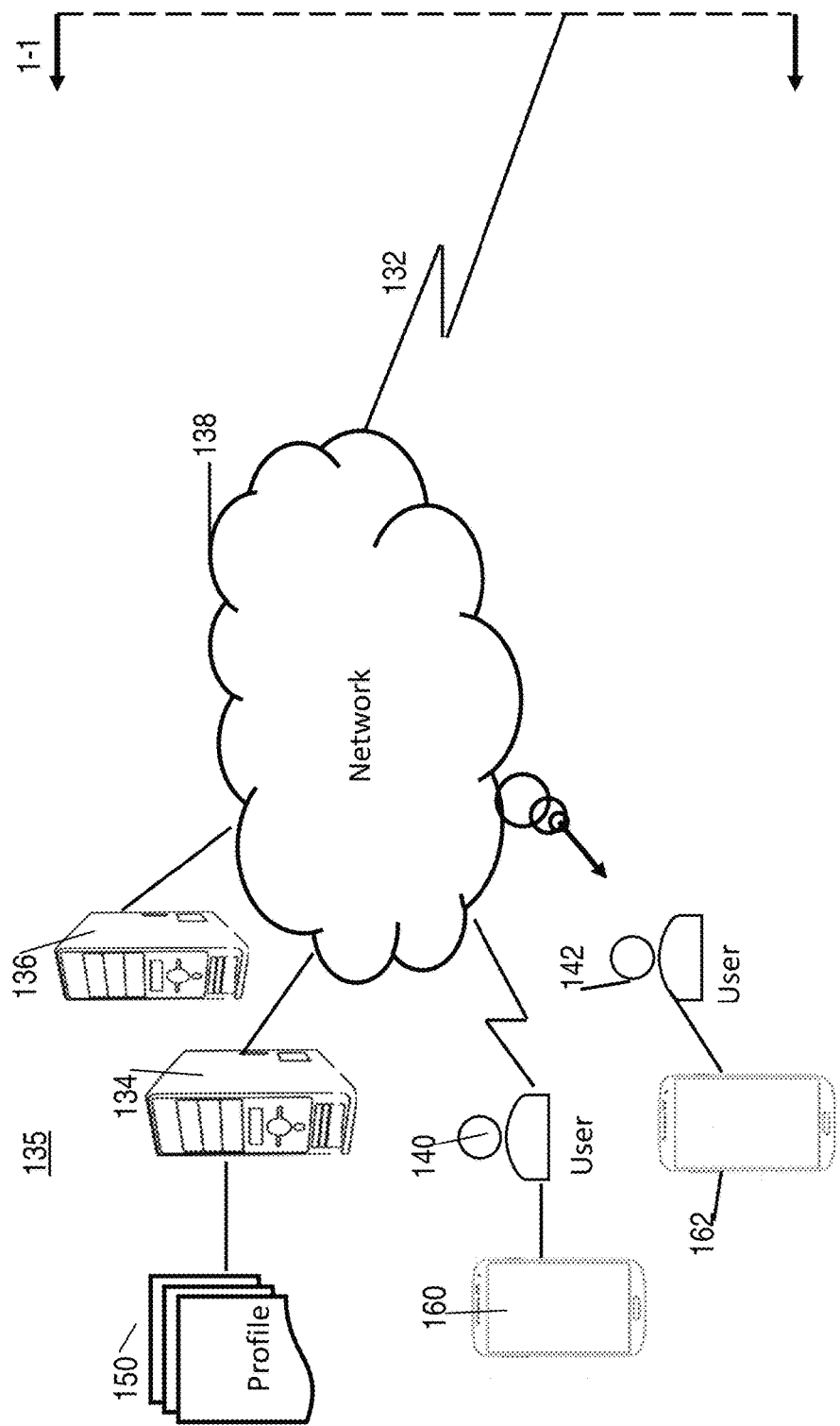

Referring now to FIGS. 1A and 1B, which may be conceptually joined to one another along respective lines 1-1, a security monitoring system, generally 100, is illustrated schematically. The monitoring system secures a structure, 102, which may be a residence such as a private home, semi-attached home, condominium, co-operative apartment space, garden apartment or the like. The structure 102 may also be adapted for commercial or industrial uses, including without limitation retail business space, warehouse, manufacturing, or the like. The monitoring system 102 includes a structure alarm 104. Alarm 104 may be adapted to detect entry into the structure 102, for example by activation of a sensor 106 associated with an entry portal, such as a doorway, and/or sensor 110 associated with a non-entry portal 112, for example a window. A condition sensor 114 may be adapted to detect motion, as by ultrasound, infrared, or machine vision, or to detect the presence of sound, for example if the structure is intended to be unoccupied and no interior sound above a certain threshold is to be expected. In some embodiments, a condition sensor 114 may detect another condition, such as a deviation in temperature within the structure from an expected normal state or a sensor affixed to a person or a pet exceeding a perimeter.

Additionally, the alarm 104 may be adapted to detect other conditions besides intrusion. Without limitation, a water sensor 116 may be provided to detect a flooding condition, particularly where some part of the structure 102 is below grade. Other alarm states may be triggered based upon other predefined environmental conditions. For example, environmental conditions may include one or more of: a threshold level of carbon dioxide, detection of propane or natural gas, a proximity sensor affixed to a person or animal going beyond a defined perimeter (such as a person with limited mental capacity, a child, a pet), a power outage, an ambient temperature falling below a threshold lower limit or exceeding an upper limit, or other condition that may be automatically ascertained. A threshold distance from a defined perimeter may be monitored via electronic timing signals transmitted from a local server and responded back from a device affixed to a person or pet.

In some embodiments, alarm 104 may be provided with condition sensor 114 and/or exterior condition sensor 118, adapted to detect localized movement, for example a pet or child moving within or outside a predetermined perimeter 120, which may be defined within or surrounding the structure 102.

The monitoring system 100 may include some or all of the aforementioned sensors, or others, and monitor the status of such sensors to detect certain emergent conditions with respect to the structure 102. In some embodiments, a lack of connectivity with one or more sensors is detected to be an alarm condition, because this may indicate that the system has been tampered with in an attempt to avoid intrusion detection. The alarm 104 is provided with an output section 122, by which the presence (or absence) of an alarm state is disseminated. The dissemination may be based upon a raised voltage or current signal, or the absence of a raised voltage or current signal. Further the output alarm state may be discriminated to communicate the nature of the alarm, based upon which sensor or sensors is triggering the alarm state. The alarm system may optionally include a local audible alarm output 124, either interior and/or exterior to the structure 102, as a deterrent to an intruder, and/or to call third party attention to the structure 102 where an intrusion or other emergent condition has occurred. The local alarm output may include one or both of an audio and visual signal output. Audio may be a simple tone and/or a spoken message indicating a nature of the alarm state. For example, if a system has more than one trigger mechanism on which an alarm state is based, an audible and/or visual indicator may indicate a reason for an alarm state. An audio signal for an entry being triggered may state the place of entry and time and date. A visual indicator may include a color code that provides a different color light emission for an entry versus a carbon dioxide level detection.

With reference to FIG. 1B across the junction line 1-1, the monitoring system 100 further includes a communication device 130 that interfaces with the alarm 104 via the output section 122. The communication device 130 will detect the output of the alarm 104 to determine if an alarm state exists within the structure. The communication device will then interface with one of a plurality of available, and possibly redundant, communication channels 132 to communicate the alarm state to one or more notification servers 135, for example redundant notification servers 134, 136, via external network 138, for further action as will be described hereinafter. The communication device 130 may interface the external network 138 in a number of ways. The structure 102 may be provided with a broadband telecommunication channel, with which the communication device 130 may access by hard wire network connection, WiFi, Bluetooth, Nearfield Communication (NFC), or the like. The communication device 130 may also have WiFi or other wireless communication to channels originating outside the structure 102. The communication device 130 may include or have access to a cellular transceiver to access a remote terrestrial station of a cellular communication network. Similarly, the communication device 130 may include or have access to a satellite communication transceiver. The communication device 130 may be in communication with a publicly switched telephone network (PSTN), also called plain old telephone system (POTS) for external communication. Moreover, from time to time the communication device 130 may check among its redundant communication channels 132 to ensure their continuing availability, and communicate to the notification servers 135 when new channels become available, or previously available channels are absent.

In some preferred embodiments, a communication device 130 is further provided with a universally unique identification number (UUID), globally unique identifier (GUID), or other identifying indicia to distinguish it from any other instances of the communication device 130, and/or any other devices, with which the notification servers 135 may communicate. In the absence of an alarm state within the structure 102, the communication device 130 will make a periodic "handshake" communication with one or both remote server devices 134, 136. Part of the handshake may include transmission of a heartbeat data package, one element of which may be a timestamp, by which the continuing operation of the communication device 130 is verified. The absence of a handshake, or an expired heartbeat timestamp may be presumed by the notification servers 135 to be an alarm state, which triggers a set of responses at the notification servers 135 according to a profile 150 associated with the particular structure 102, as described in further detail hereinafter.

Upon detection of an alarm signal output from the alarm 104, the communication device will communicate the alarm status within the structure 102 to either or both of redundant notification servers 134, 136. The communication between the communication device 130 and the notification servers 135 may further include the nature of the emergent condition, which is to say the identity and/or location of the sensor and/or type of sensor that is responsible for generating the alarm state. The notification servers 134, 136 may also communicate with one another to compare data concerning the status of the structure 102, in part to ensure connectivity between the communication device 130 and both notification servers 134, 136 is maintained. The communication of an alarm state within the structure by the communication device 130 to the notification servers 134, 136, triggers a response by the notification servers 134, 136 according to a predetermined profile associated with the particular structure 102.

In some embodiments, the notification servers 134, 136 may be "local" to an ICS 114 in that they are accessible via a local data transfer infrastructure, such as WiFi and/or near field communication's, such as Bluetooth or ANT. In other embodiments a notification server may be remote, in the sense that the communication link between the ICS 114 and the notification server 134, 136 includes a distributed network, such as, for example, one or more of: the Internet, a cellular network, Virtual Private Networks and the like.

At least one purpose of the remote monitoring system 100 is to alert an owner, manager, or other party responsible for the structure 102, collectively user 140, to the presence of an emergent condition at the structure 102 that requires the attention of the user 140. In furtherance of this goal, the notification servers 134, 136 will store a profile 150 that is associated with the particular structure 102, for example by the UUID or the like of the communication device 130. This profile 150 will include a communication protocol having certain criteria. A first response of the notification servers 135 may be to notify the user 140 by telephone (cellular and/or landline) and/or text message, or another instant delivery communication means. The notification servers may solicit a reply from the user 140, to verify the message is received. If there is no reply, or there is other indicia that the user is not available to receive the message, the notification servers 135 may contact an alternate user 142, again by immediate delivery communication, to include without limitation telephone or SMS text message.

In other embodiments, the notification servers 135 may contact the user 140 and/or alternate user 142 according to certain predetermined criteria. These criteria may include, without limitation, a predetermined schedule of "do not disturb" hours; a specific ad hoc indication of temporary unavailability, either for a predetermined or an indeterminate duration. In certain embodiments, the user 140 and/or alternate user 142 may share their location according to a GPS receiver associated with a smartphone, tablet, or other mobile device 160, 162 respectively. In that case, the remote servers 134 and 136 can be instructed to contact the nearest of user 140 and alternate user 142. Alternately, the user 140 may be a first point of contact unless her location is outside a predetermined fenced area, in which case an alternate user 142 is contacted. These and other criteria may be combined. Alternately, or additionally, third, fourth, and subsequent points of contact may be established. In any of the foregoing scenarios, the point of contact, e.g., user 140, alternate user 142, etc., may have the option to reset the alarm to a ready state. Optionally or additionally, if the notification servers 135 do not receive any response from one of the users 140, 142, as described above, the notification servers 135 may interpret that failure to respond as a further emergency condition. In that case, any subsequent users to be contacted may also be notified of the failure to respond by a previous notified user, among any other alarm notifications given.

Alternately or additionally, the notification servers 135 may monitor an elapsed time from a time of notification of an alarm state given to a user 140, 142 or the like, or from a time such notification is acknowledged, until the alarm is reset to a ready state, presumably by the user or a designee. This elapsed time determination may include consideration of the location of user 140 or 142 when notified of the alarm condition, where these are made known to the notification servers 135 as described above. A failure to reset the alarm within a predetermined time may be interpreted as another alarm condition. In any or all of the foregoing use cases, it may be presumed that the user 140, 142, etc. is unable to acknowledge and/or reset an alarm due to having been injured, incapacitated, or the like. In that case, the profile 150 may direct the notification servers 135 to notify the police, and/or medical assistance personnel to respond to the structure 102, and/or the location of the user 140, 142, where the user location is made known to the notification servers 135 as described above.

Still further, consistent with the present disclosure, profile 150 may provide a plurality of alternative responses, based upon possible alarm status and monitored conditions, i.e., other variables monitored by the notification servers 135 and or communication module 130 including without limitation, elapsed times, user location, or like. As some non-limiting examples, this may include an alarm turning on in an empty house, an alarm being directed to a specific condition, owner or respondent availability, and/or owner or respondent location. In the case of an empty house in an alarm state, the notification servers 135 may attempt to contact the individual designated for response who is deemed closest to the existing alarm system. Alternatively, in this case, the notification servers 135 may present the user 140, 142, etc., with multiple options for remotely determining whether the alarm state needs to be responded to, and disabling the alarm system if not. The notification servers 135 may have access to GPS, WiFi, or other types of location data for various authorized users 140, 142, etc., or respondents, in addition to sensors that monitor conditions. This location data may be used, possibly in conjunction with other sensors or communication means, to determine the availability and/or location of a user or respondent, with relation to the structure 102. This data may be used with user-set preferences for the profile 150 to determine the proper response in an alarm state.

Figure 2:
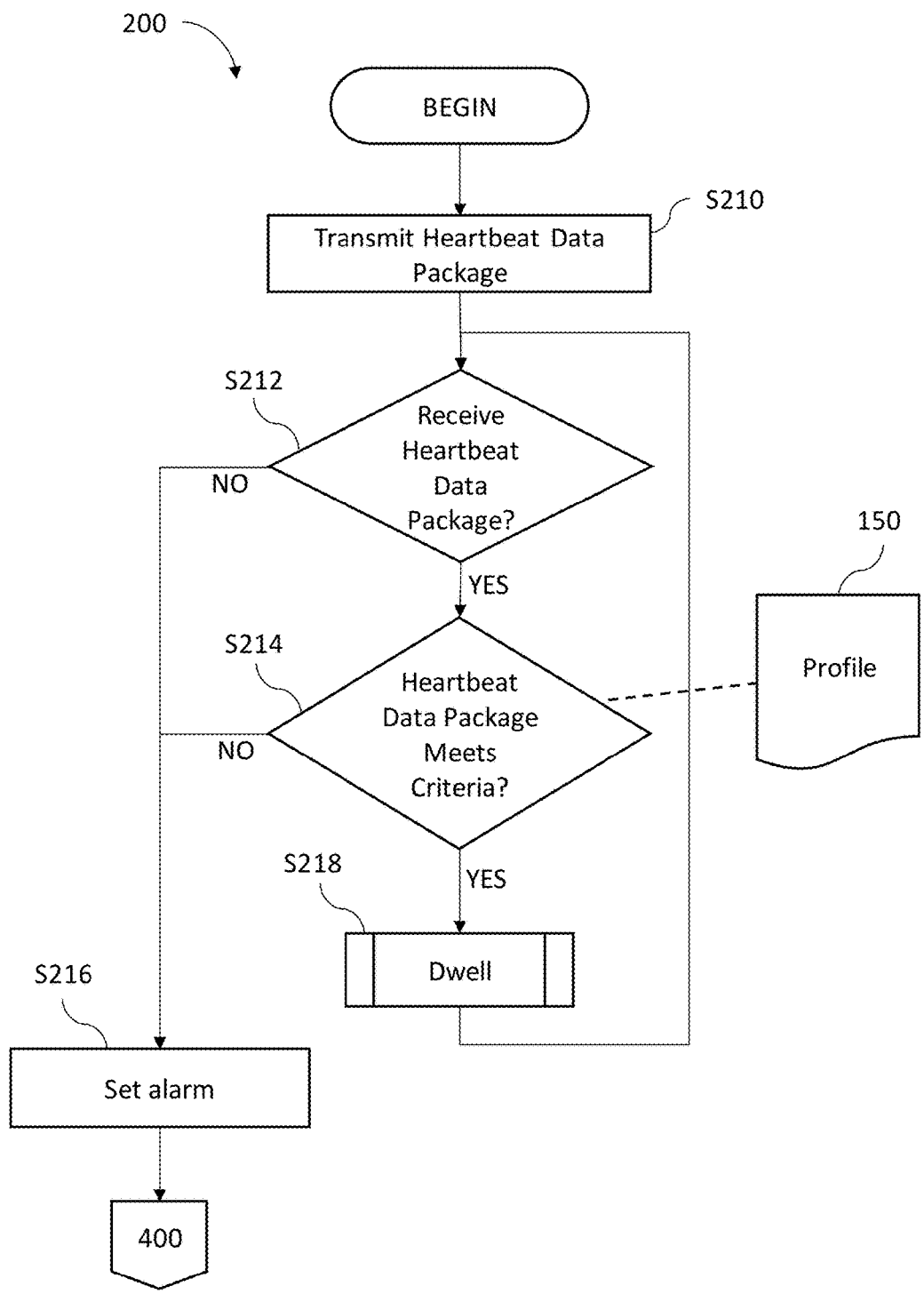
FIG. 2 illustrates a flowchart depicting an exemplary handshake procedure as part of monitoring and communication for a security monitoring system.

Referring now to FIG. 2, illustrated is a flowchart depicting a routine, generally 200, involving communication to, from, and between communication module 130 and notification servers 135. More specifically, routine 200 includes a handshake procedure between communication module 130 and notification servers 135. At some predetermined interval, the communication module 130 may transmit S210 a heartbeat data package to notification servers 135. The notification servers 135, or any of them, 132, 134, check for receipt of this heartbeat data package, S212. The notification servers 135 act on the received heartbeat data package S214, according to one or more criteria. The criteria may include one or more of determining a maximum permissible time elapsed since the last heartbeat transmission, examining a timestamp on the present heartbeat transmission being within a given tolerance of the current time, and/or the heartbeat package including certain data, for example a corresponding UUID of the communication module 130, all without limitation. These criteria may be generic to all instances of a communication module 130, or may be specific to a particular instance associated with a particular structure 102. In the latter case, these specific criteria may be stored in a profile 150 associated with the particular structure 102 and/or instance of communication module 130. A positive outcome of the decision at S214 indicates normal condition or the lack of alarms at the structure 102. The subroutine 200 then returns to await the next heartbeat transmission S210. A negative outcome of decision S214 leads to an alarm condition S216. The notification servers 135 respond to the alarm condition in accordance with the corresponding profile 150 for the structure 102 associated with the communication module 130 that caused the alarm. In a further embodiment, the handshake subroutine may include a predetermined dwell S218, before a check of receipt of a subsequent heartbeat data package, as in S212. If no heartbeat is received by the notification servers 135 from the communication module 130 within the dwell time, an alarm condition may be raised S216. An alarm condition may be communicated, for example as described by routine 400 below, without limitation. According to the heartbeat subroutine, an alarm condition is maintained until reset by a user 140, 142, in accordance with profile 150.

Figure 3:
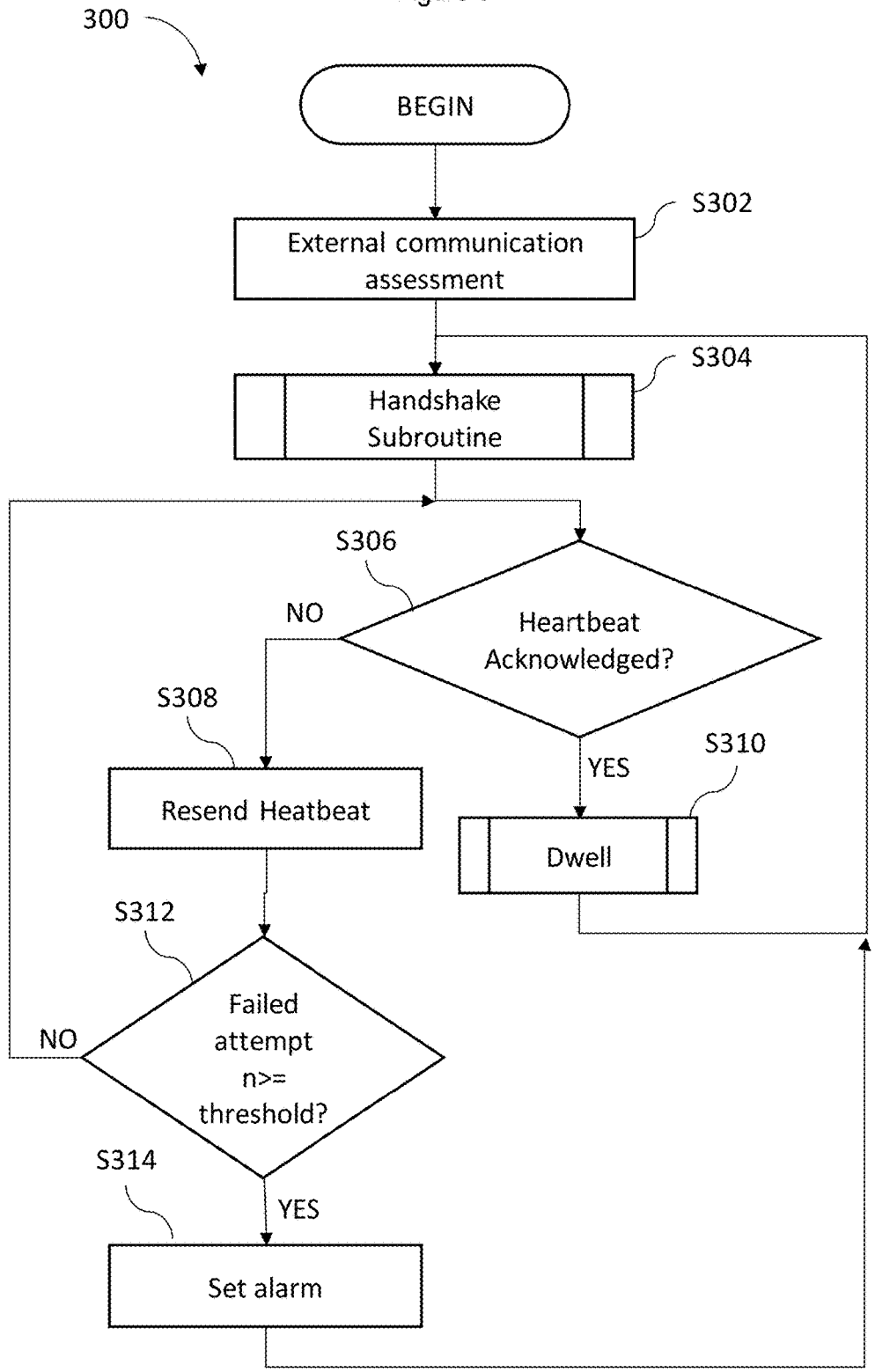
FIG. 3 illustrates a flowchart depicting an exemplary procedure as part of monitoring and communication for a security monitoring system.

Referring now to FIG. 3, illustrated is a flowchart depicting a monitoring routine, generally 300, involving communication to, from, and between communication module 130 and notification servers 135. At a beginning of the routine 300, the communication module assesses its external communication situation S302. The communication module 130 may have connectivity with a broadband telecommunication channel, for example by hard wire network connection, wireless connection including WiFi, Bluetooth, and/or Near-field Communication (NFC), or the like. The communication device 130 may also have WiFi or other wireless communication to channels originating outside the structure 102. The communication device 130 may include or have access to a cellular transceiver to access a remote terrestrial station of a cellular communication network. Similarly, the communication device 130 may include or have access to a satellite communication transceiver. The communication device 130 may be in communication with a publicly switched telephone network (PSTN), also called plain old telephone system (POTS) for external communication. The external communication situation assessment S302 may occur upon startup of the communication module 130, and/or from time to time as predetermined intervals. The external communication situation assessment S302 may include the communication device 130 checking for continued connectivity among redundant communication channels 132, to ensure their continuing availability. The communication module 130 may communicate to the notification servers 135 when new channels become available, or previously available channels are absent.

Once a communication channel, for example with notification servers 135 is assessed S302, the communication module 130 may initiate a handshake subroutine S304, for example the handshake subroutine, 200, described above, or other handshake protocol. A heartbeat data package sent from communication module 130 to notification servers 135 may optionally include some or all of the results of the external communication assessment S302 in addition to any other prescribed heartbeat package data.

The communication module 130 may wait for and/or receive an acknowledgement S306 from the notification servers 135 that the heartbeat data package has been received and/or accepted. In the absence of an acknowledgement of receipt, the communication module 130 may attempt to re-send S308. The resending S308 may optionally occur only after a predetermined dwell period, to avoid double-sending where there are delays in transmission. The re-sending S308 of the heartbeat data package may be via the same channel, and/or an alternate channel. The heartbeat data package may also optionally be re-sent to the same notification server 132, and/or a secondary or backup notification server 134. Optionally, the communication module 130 may monitor the number of failed attempts and/or failures of acknowledgement S312. If the number of failed attempts and/or failures of acknowledgement exceeds a threshold, an alarm condition may be set S314, for example as a means to inform one of notification servers 135 of the unavailability of another of the notification servers 135. After affirmative acknowledgement of receipt of the heartbeat data package S306, the communication module 130 sets a predetermined dwell time S310 until a subsequent heartbeat data package is due and/or transmitted.

Figure 4:
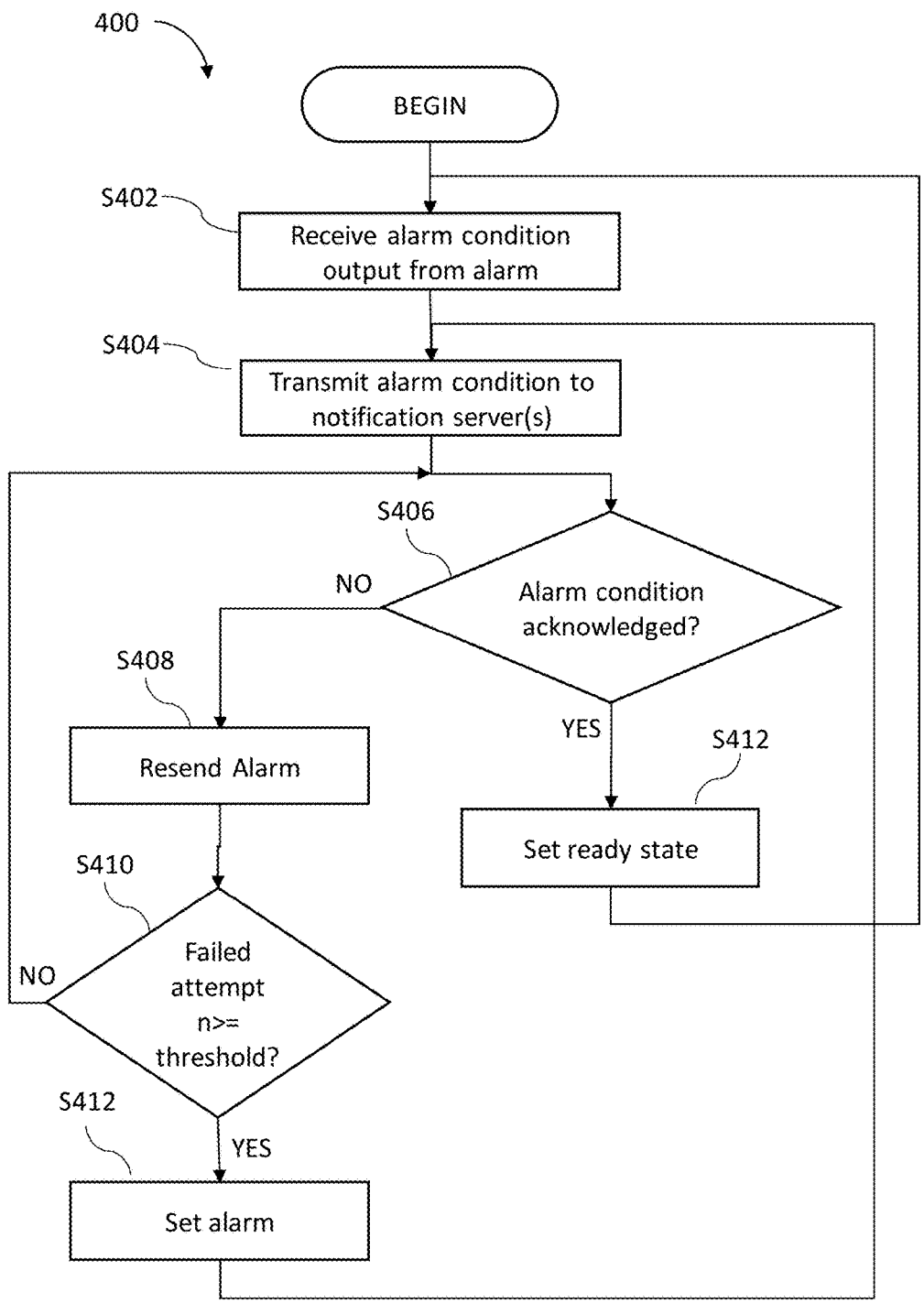
FIG. 4 illustrates a flowchart depicting an exemplary alarm condition communication procedure as part of monitoring and communication for a security monitoring system.

Referring now to FIG. 4, illustrated is a flowchart depicting a monitoring routine, generally 400, involving communication to, from, and between communication module 130 and notification servers 135. The monitoring routing 400 generally includes the communication of an alarm condition at the structure 102 to the notification servers 135. The communication module 130 receives an alarm condition output S402 from the output section 122 of alarm 104. If an alarm condition exists, the fact of that condition and, if available and to the extent known, the nature of the condition (e.g., door/window open; heat/motion detected inside/outside perimeter, etc., without limitation) are communicated S404 to the notification servers 135. As noted above with respect to routine 300, the communication module 130 may wait for and/or receive an acknowledgement S406 from the notification servers 135 that the alarm condition has been received and/or accepted.

In the absence of an acknowledgement of receipt, the communication module 130 may attempt to re-send the alarm S408. Optionally, the resending S408 may be after some predetermined dwell to avoid double-sending. The re-sending of the alarm condition data may be via the same channel, and/or an alternate channel. The alarm communication may also optionally be re-sent to the same notification server 132, and/or a secondary or backup notification server 134. Optionally, the communication module 130 may monitor the number of failed attempts and/or failures of acknowledgement S410. If the number of failed attempts and/or failures of acknowledgement exceeds a threshold, an alarm condition may be set S412, for example as a means to inform one of notification servers 135 of the unavailability of another of the notification servers 135.

After affirmative acknowledgement of receipt of the alarm condition S406, the communication module 130 enters a ready state. Subsequent communications from communications module 130 to notification servers 135 will include the current status of acknowledged alarm conditions. The above description of monitoring routine 400 is not to the exclusion of other actions in response to an alarm condition, including without limitation the sounding of an audible alarm output 124 at the premises 102, or others.

Figure 5:
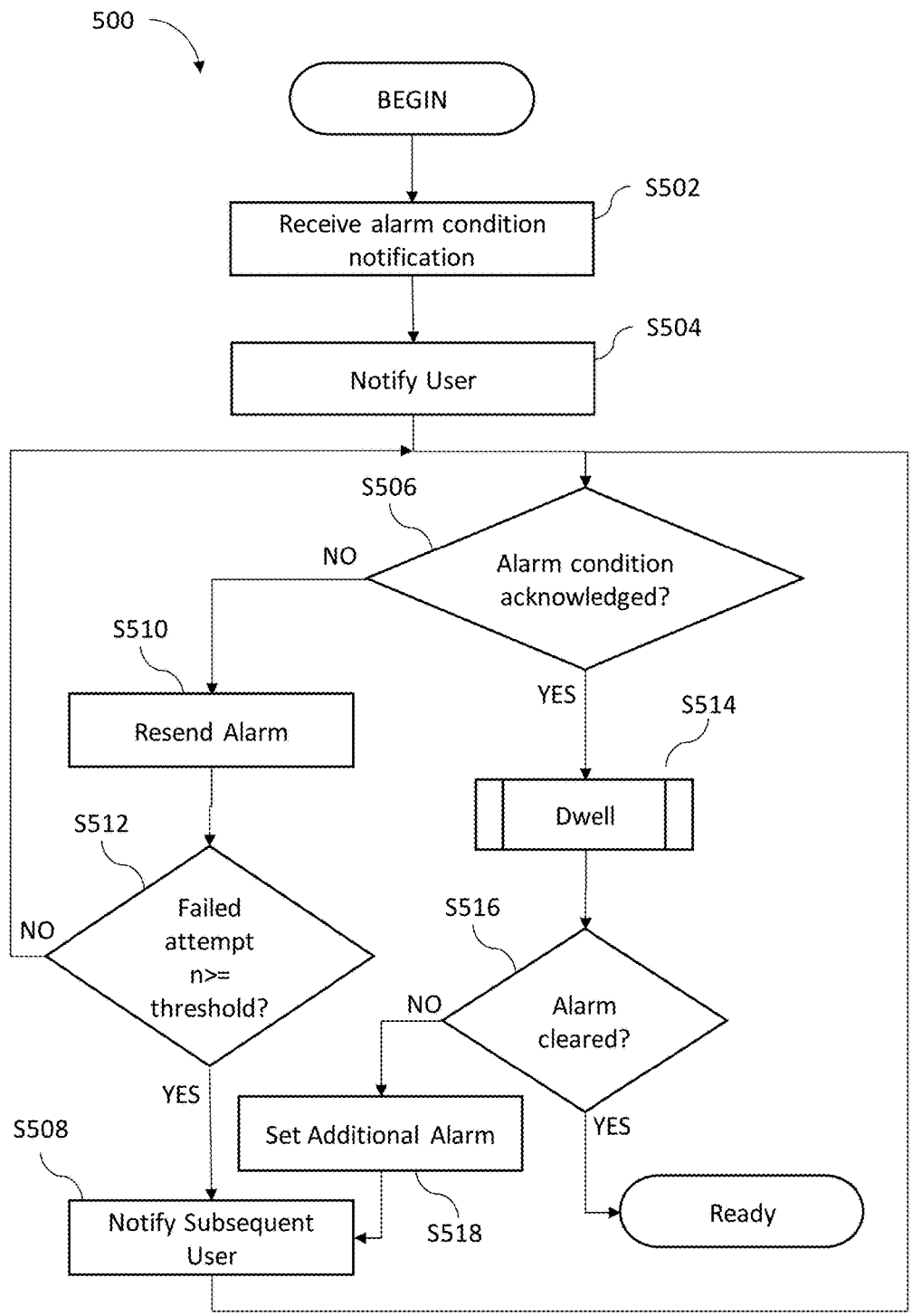
FIG. 5 illustrates a flowchart depicting an exemplary notification procedure as part of monitoring and communication for a security monitoring system.

Referring now to FIG. 5, illustrated is a flowchart depicting a monitoring routine, generally 500, involving communication to, from, and between communication module 130 and notification servers 135. More particularly, routine 500 includes receipt of communication S502 by one or more of notification servers 135 from communication module 130 of an alarm condition at a structure 102. In response to the setting of an alarm condition, notification servers 135 will act in accordance with a profile 150 associated with the structure 102. The association may include and/or be determined by reference to a UUID or other identifier of the communication module 130 transmitted with the communication of the alarm condition S502.

In accordance with the profile 150, the notification servers 135 make a first notification S504 to a first user 140 that an alarm condition exists at the structure 102. The first user 140 may be specified by the profile 150, in accordance with a schedule of responder availability states. A responder availability state may be input by a user, such as, for example, a predetermined "on-call" schedule therein; or may be determined via automatic processes and apparatus. By way of non-limiting example, an automatic process may be based upon a determined location of a user device, associated with a responder. The user device may include a controller and a geo-location device, such as GPS mechanism and software. In some embodiments, a user device may include a smart phone or tablet. Availability may be calculated based upon a physical geo-location of the user device (and by extension the user acting as a responder). A calculation may be made to determine a travel time to respond to the alarm state. Based upon a calculated travel time, a responder may be marked as available to respond or unavailable to respond. A server may continue processing an alarm until an available responder has responded to the server with a resolution to the alarm state.

In some preferred embodiments the resolution is recorded in the server, as well as the type of alarm state, a date and time and a responder providing the resolution.

Optionally, the responder may have a predetermined schedule of "do not disturb" hours associated with him/her. Optionally, the first user may also set a specific ad hoc indication of temporary unavailability, either for a predetermined or an indeterminate duration.

In certain embodiments, the first user 140 and/or alternate user 142 may share their location with the notification servers 135, for example as determined via a GPS receiver associated with a smartphone, tablet, or other mobile device 160, 162 respectively associated with each such user. In that case, the profile 150 may include criteria to first contact a user nearest the structure 102. Alternately, the first user 140 may be a first point of contact by the notification servers 135, unless her location is outside a predetermined fenced area, in which case an alternate user 142 is contacted. These and other criteria may be combined. Alternately, or additionally, third, fourth, and subsequent points of contact may be established in the profile 150.

Continuing with the routine 500, the notification servers 135, or any of them, await an acknowledgement of the alarm condition S506 from the first user 140. If an alarm is acknowledged, the routine continues as shown. If no acknowledgement is received in a given time, the notification servers 135 may notify a subsequent user 142, S508, consistent with the profile 150. Once again, the system may wait some predetermined time for an acknowledgement S506. The notification chain may thereafter include a third or fourth, etc., user to be notified of the alarm condition. Optionally, the notification servers 135 may make multiple attempts, S510, to contact a given user, and await an acknowledgement. In that case, a subsequent user contact S508 may be deferred until a threshold number of attempts S512 have failed.

In some embodiments of the present disclosure, after an acknowledgement is achieved, the notification servers 135 will monitor the time until the alarm condition is cleared or reset at the structure 102. The alarm condition may be considered reset by the removal of the condition leading to the alarm, e.g., a sensor operation, or a missing or delayed heartbeat data package, without limitation. Still further in certain embodiments, following an acknowledgement of the alarm notification, if the alarm condition is not cleared and/or reset within a predetermined time frame, a new alarm condition is raised. Therefore, following acknowledgement at S506, a predetermined dwell time S514 is entered before the notification servers 135 will determine if the alarm condition has been cleared S516. If the alarm is cleared and/or reset before the dwell time S510 expires, it can be presumed that a user 140, 142, etc., has addressed the alarm condition at the structure 102. Thereafter, the alarm system 104 will assume a ready state. On the other hand, if the alarm condition is not cleared and/or reset before the expiration of dwell time S514, a new alarm condition can be set, S514. The alarm condition set S518 can be communicated in accordance with the profile 150. Optionally, the notification servers 135 may contact a responder 140, 142, etc., other than the responder or other user whom most recently acknowledged the alarm condition S506. In such an embodiment, it may be presumed that the last user to acknowledge the alarm condition is incapacitated or otherwise unavailable to address the condition at the structure 102 based on the failure to clear and/or reset the alarm.

Figure 6:
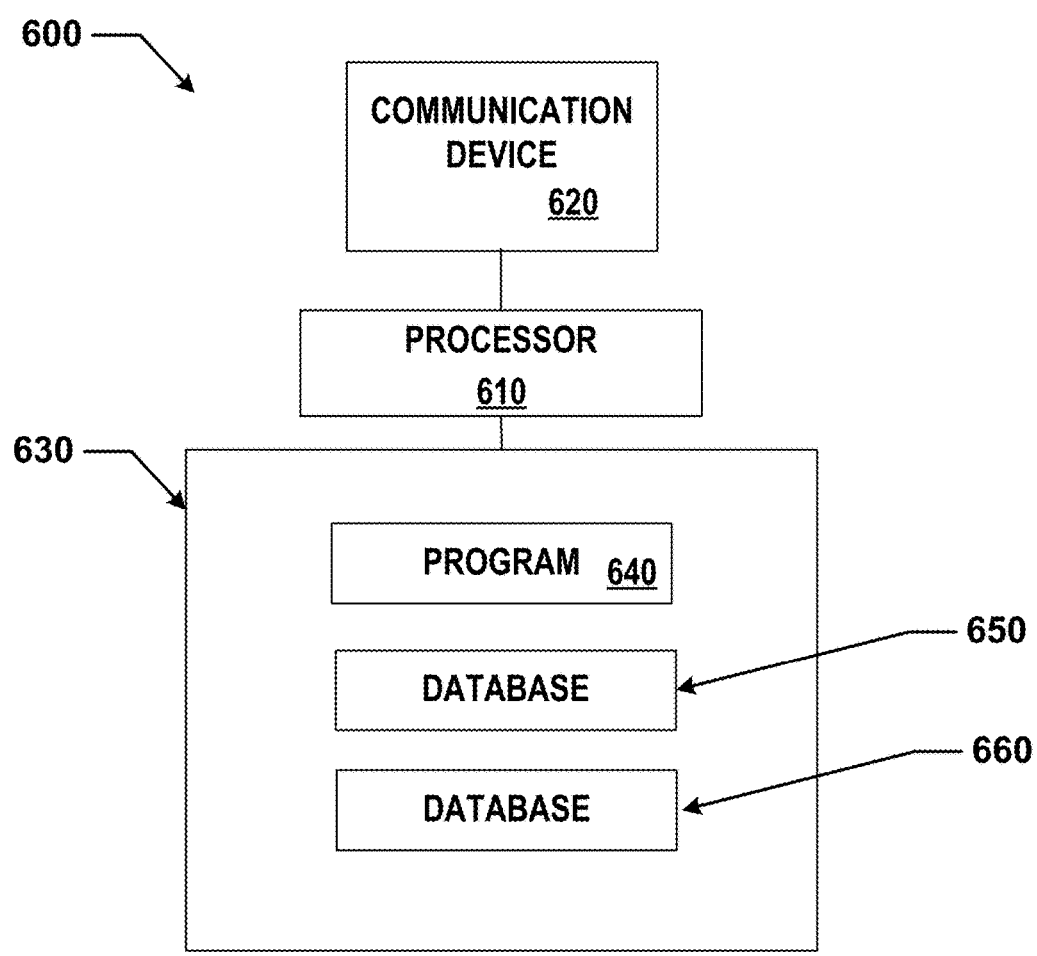
FIG. 6 illustrates an automated controller that may be useful as part of a security monitoring system.

FIG. 6 illustrates an automated controller that may be used to implement various aspects of the present invention, in various embodiments, and for various aspects of the present invention, controller 600 may be included in one or more of: a wireless tablet or handheld device, a server, a rack mounted processor unit. The controller may be included in one or more of the apparatus described above, such as the Server, and the Network Access Device. The controller 600 comprises a processor unit 610, such as one or more semiconductor based processors, coupled to a communication device 620 configured to communicate via a communication network (not shown in FIG. 6). The communication device 620 may be used to communicate, for example, with one or more online devices, such as a personal computer, laptop, or a handheld device.

The processor 610 is also in communication with a storage device 630. The storage device 630 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 630 can store a software program 640 for controlling the processor 610. The processor 610 performs instructions of the software program 640, and thereby operates in accordance with the present invention. The processor 610 may also cause the communication device 620 to transmit information, including, in some instances, control commands to operate apparatus to implement the processes described above. The storage device 630 can additionally store related data in a database 650 and database 660, as needed.

Figure 7:
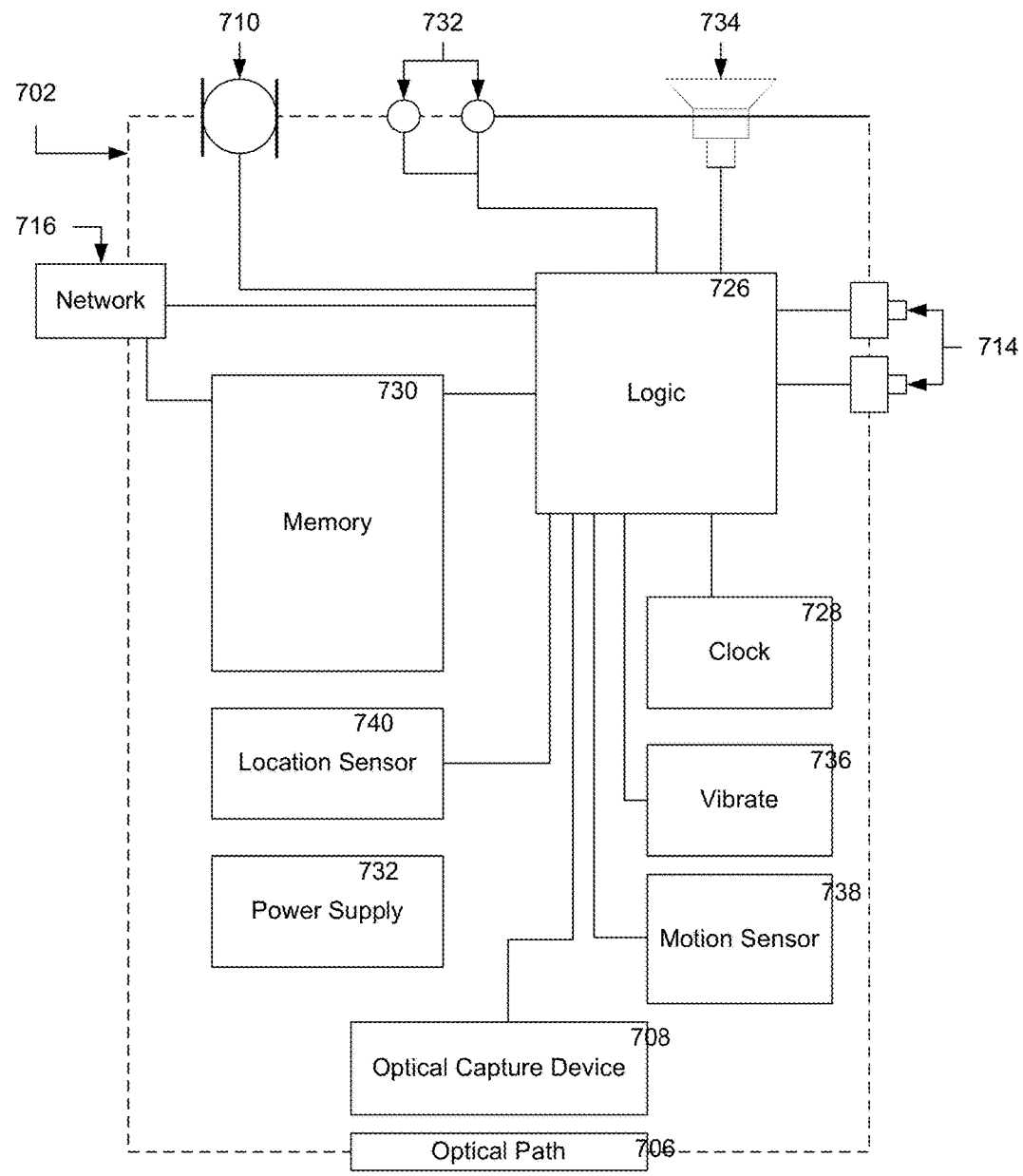
FIG. 7 illustrates a block diagram of an exemplary mobile device.

Referring now to FIG. 7, a block diagram of an exemplary mobile device 702. The mobile device 702 comprises an optical capture device 708 to capture an image and convert it to machine-compatible data, and an optical path 706, typically a lens, an aperture or an image conduit to convey the image from the rendered document to the optical capture device 708. The optical capture device 708 may incorporate a Charge-Coupled Device (CCD), a Complementary Metal Oxide Semiconductor (CMOS) imaging device, or an optical sensor of another type.

A microphone 710 and associated circuitry may convert the sound of the environment, including spoken words, into machine-compatible signals. Input facilities may exist in the form of buttons, scroll wheels, or other tactile sensors such as touch-pads. In some embodiments, input facilities may include a touchscreen display. External electrical connection points 714 may allow connection to external devices such as microphones as a non-limiting example.

Visual feedback to the user is possible through a visual display, touchscreen display, or indicator lights. Audible feedback 734 may come from a loudspeaker or other audio transducer. Tactile feedback may come from a vibrate module 736.

A motion sensor 738 and associated circuitry convert the motion of the mobile device 702 into machine-compatible signals. The motion sensor 738 may comprise an accelerometer that may be used to sense measurable physical acceleration, orientation, vibration, and other movements. In some embodiments the motion sensor 738 may include a gyroscope or other device to sense different motions.

A location sensor 740 and associated circuitry may be used to determine the location of the device. The location sensor 740 may detect Global Navigational Satellite System (GNSS) radio signals from satellites, of which Global Position System (GPS), are examples, or may also use assisted GNSS where the mobile device may use a cellular network to decrease the time necessary to determine location. In some embodiments, the location sensor 740 may use radio waves to determine the distance from known radio sources such as cellular towers to determine the location of the mobile device 702. In some embodiments these radio signals may be used in addition to GNSS.

The mobile device 702 comprises logic 726 to interact with the various other components, possibly processing the received signals into different formats and/or interpretations. Logic 726 may be operable to read and write data and program instructions stored in associated storage or memory 730 such as RAM, ROM, flash, or other suitable memory. It may read a time signal from the clock unit 728. In some embodiments, the mobile device 702 may have an on-board power supply 732. In other embodiments, the mobile device 702 may be powered from a tethered connection to another device, such as a Universal Serial Bus (USB) connection.

The mobile device 702 also includes a network interface 716 to communicate data to a network and/or an associated computing device. Network interface 716 may provide two-way data communication. For example, network interface 716 may operate according to the internet protocol. As another example, network interface 716 may be a local area network (LAN) card allowing a data communication connection to a compatible LAN. As another example, network interface 716 may be a cellular antenna and associated circuitry which may allow the mobile device to communicate over standard wireless data communication networks. In some implementations, network interface 716 may include a Universal Serial Bus (USB) to supply power or transmit data. In some embodiments other wireless links may also be implemented.

As an example of one use of mobile device 702, a reader may scan some coded information from a location marker in a facility with the mobile device 702. The coded information may include for example a hash code, bar code, RFID or other data storage device. In some embodiments, the scan may include a bit-mapped image via the optical capture device 708. Logic 726 causes the bit-mapped image to be stored in memory 730 with an associated time-stamp read from the clock unit 728. Logic 726 may also perform optical character recognition (OCR) or other post-scan processing on the bit-mapped image to convert it to text. Logic 726 may optionally extract a signature from the image, for example by performing a convolution-like process to locate repeating occurrences of characters, symbols or objects, and determine the distance or number of other characters, symbols, or objects between these repeated elements. The reader may then upload the bit-mapped image (or text or other signature, if post-scan processing has been performed by logic 726) to an associated computer via network interface 716.

As an example of another use of mobile device 702, a reader may capture some text from an article as an audio file by using microphone 710 as an acoustic capture port. Logic 726 causes audio file to be stored in memory 730. Logic 726 may also perform voice recognition or other post-scan processing on the audio file to convert it to text. As above, the reader may then upload the audio file (or text produced by post-scan processing performed by logic 726) to an associated computer via network interface 716.

Additional examples may include sensor arrays, audio capture arrays and camera arrays with multiple data collection angles that may be complete 360 degree camera arrays or directional arrays, for example, in some examples, a sensor array (including image capture sensors) may include at least 120 degrees of data capture, additional examples include a sensor array with at least 180 degrees of image capture; and still other examples include a sensor array with at least 270 degrees of image capture. In various examples, data capture may include sensors arranged to capture image data in directions that are planar or oblique in relation to one another.

By way of non-limiting example, functions of the methods and apparatus presented herein may include one or more of the following factors that may be modeled and/or tracked over a defined period of time, such as, for example, an expected life of a build (i.e. 10 years or 20 years).

Figure 8:
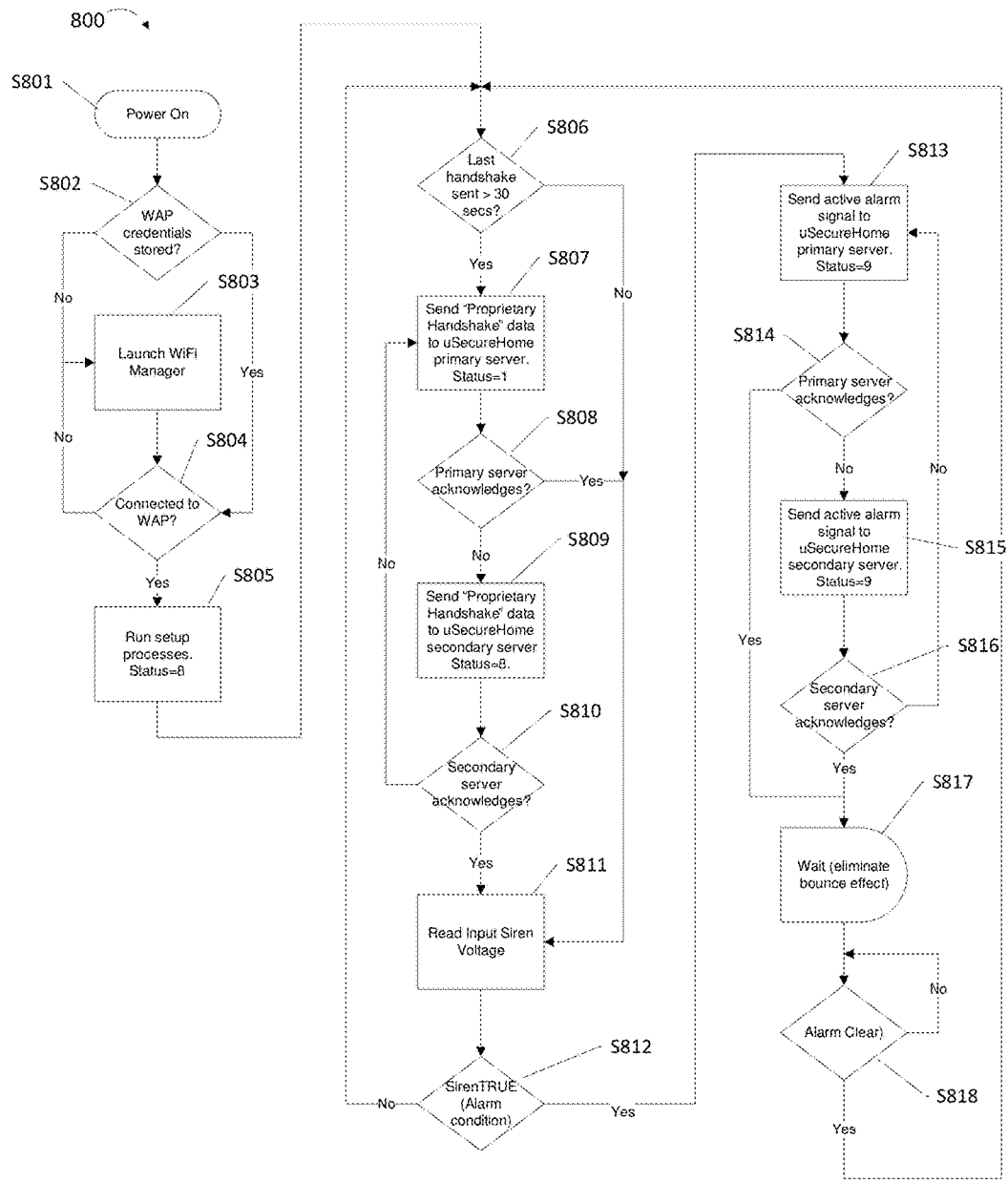
FIG. 8 illustrates a flowchart depicting an exemplary summary of operating steps of a security monitoring system.

Referring now to FIG. 8, illustrated is a flowchart depicting an exemplary summary of operating steps of a security monitoring system, generally 800. More particularly, operations may commence with the security monitoring system being powered on S801. A controller may check for the existence of stored Wireless Access Point (WAP) credentials S802. If there are no stored credentials, the system may further operate by launching a WiFi manager S803. If there are stored credentials or if step S802 has been performed the operations may next continue to determine if the security monitoring system is connected to a WAP S804. If the security monitoring system is not connected to a WAP then the operations may proceed back to launching a WiFi manager at step S803 and proceeding. If the security monitoring system is connected to WAP then the system may next proceed to running setup processes S805.

After setup processes have be initialized, the system may operate in a continuous monitoring loop that revolves around the monitoring of whether a last handshake was executed in the last 30 seconds S806. This operation may among other aspects monitor that the security system has maintained a continuous link to proprietary server systems. The monitoring loop will continue until 30 seconds has passed since the last handshake with the proprietary servers. By continuing the system will jump to monitoring the voltage input to a siren that is described further in later sections as S811.

Once 30 seconds has passed the system will send proprietary handshake data to the proprietary server at step S807. Next the system will ascertain S808 whether it has received acknowledgement from the primary server. If it has the system will again jump to monitoring the voltage input to a siren that is described further in later sections as S811. If not, the system will send a proprietary handshake data communication to the proprietary second server at S809. In a similar manner to the processing with the primary server, if the secondary server acknowledges receipt S810 of the handshake protocol, it will jump to monitoring the voltage at the siren of the security system. If the system does not receive acknowledgement it will jump back to step S807 looking for communication with the primary proprietary server.

At step S811, the system may read the voltage at an input to a system siren, or may through other methods determine if there is an alarm state of the security system S812. If there is no alarm state, operation will jump back to looping for 30 seconds at step S806. If there is an alarm state the system will continue processing.

If there is an alarm state, the system in the example sends an active alarm signal to the primary server of the proprietary server at step S813. Thereafter, the system will await an acknowledgement signal of receipt of the alarm signal from the primary server at step S814. If the primary server does not acknowledge receipt, the system will attempt to send an active alarm signal to the secondary proprietary server at step S815. Thereafter, the system will await acknowledgment of receipt of the alarm signal from the secondary server at step S816. If no such handshake confirmation comes from the secondary server, the system will loop back to step S813 and attempt to send a message to the primary proprietary server.

If either server acknowledges receipt of the alarm state message, then the processing may continue. At step S817, a holding step or delay step may be inserted into the operational system to ensure that system status changes have enough time to take hold at various components of the communication system. After delay to remove any "bounce effect", the system will next initiate a processing step to clear the alarm condition of the security monitoring system at step S818. Thereafter it will return back to looping for 30 seconds at step S806.

Referring to FIG. 9A, an exemplary interconnection of elements of the security monitoring system with existing security systems, the "Cloud", servers and mobile devices is illustrated. A security monitoring system 910 may be connected to an existing security system 920. The security monitoring system may be connected via the internet/cloud 930 to proprietary servers such as a primary server 940 or a secondary server 950. The internet/cloud 930 may allow the proprietary servers to communicate with various types of mobile devices 960 to communication with a user.

Figure 9B:
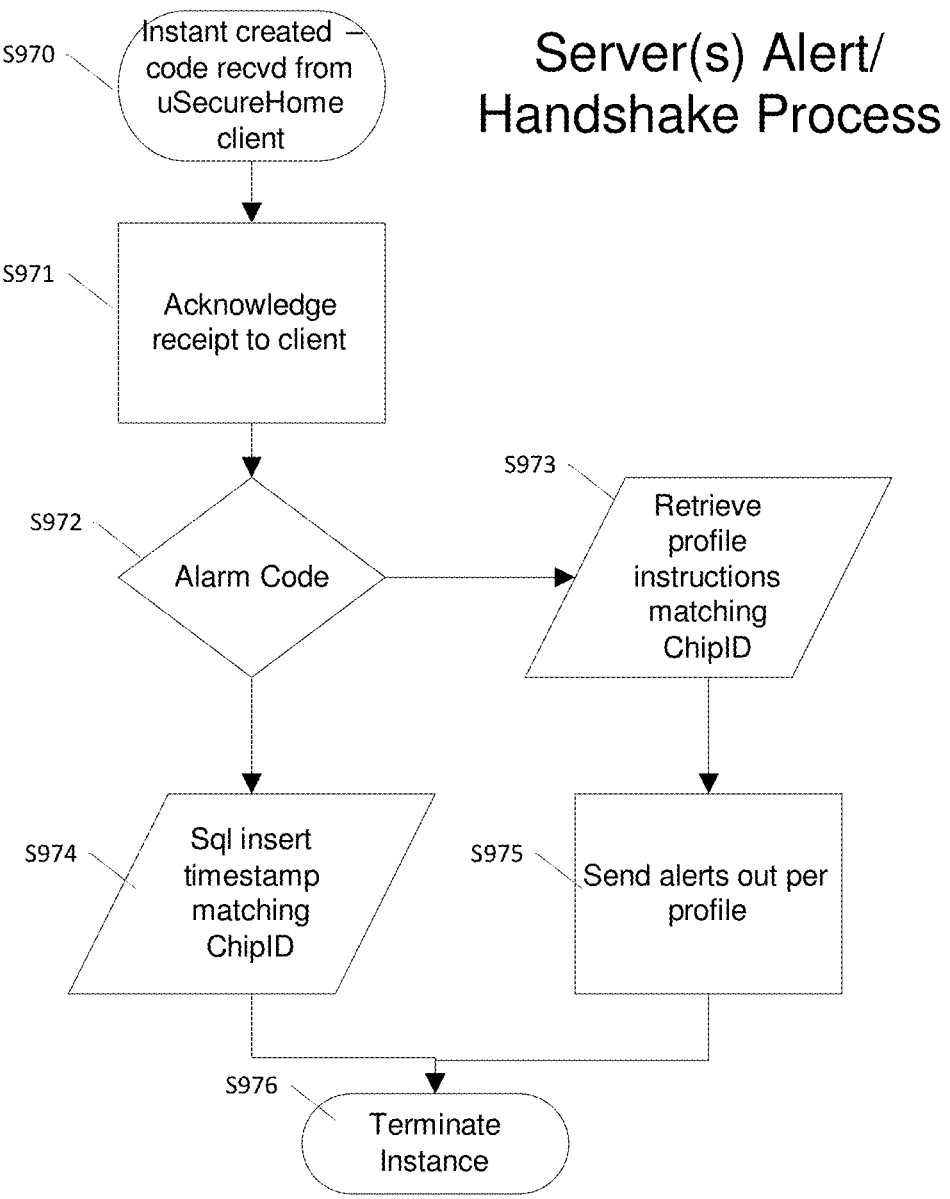

Referring to FIG. 9B, an exemplary server alert handshake protocol is illustrated. As mentioned previously, the security monitoring system may detect an alarm state and send communication of that alarm state to a proprietary server. At step S970, the alarm state alert may be received by the proprietary server. The proprietary server may acknowledge receipt back to the security monitoring system at step S971. The proprietary server may continue to process the alarm state at step S972. In some examples, the continued processing may look at codes related to the alarm state that was passed as well as user settings associated with the particular user of the alarm system and determine whether additional communication is required to a user or other entity. If for the particular user, an identity which may be associated to the "ChipID" of the security monitoring system, the system has stored records which indicate further action, the system may retrieve particular user instructions related to their profile at step S973. In some examples, the particular alarm code may not warrant additional communication such as shown at step S974 where just a record of the alarm state may be retained. In the other cases, additional alerts S975 may be sent. Thereafter, the proprietary server may terminate the instance of the alarm state at step S976.

Referring to FIG. 9C, another processing action of the proprietary servers is illustrated. In some examples, an operational server may process its stored records from the various users that it supports. In some examples, the analysis may show user records where a time limit for receiving handshake alerts has been exceeded at step S980. There may be numerous reasons why such a time limit has been exceeded; however, a malfunction at the security monitoring location may be included. Additionally, the time limit may have been exceeded because the system has lost WiFi or other communications abilities with the server. In such case a user profile for the particular monitoring location may indicate various types of communication that the user desires when such an indication of loss of communication with the proprietary server has been indicated. The system may process the user profile at step S981. The system may then send alerts of a designated type out to various recipients as has been predetermined at step S982. The system may then continue to monitor the time stamps for various users back at step S980.

Figure 10:
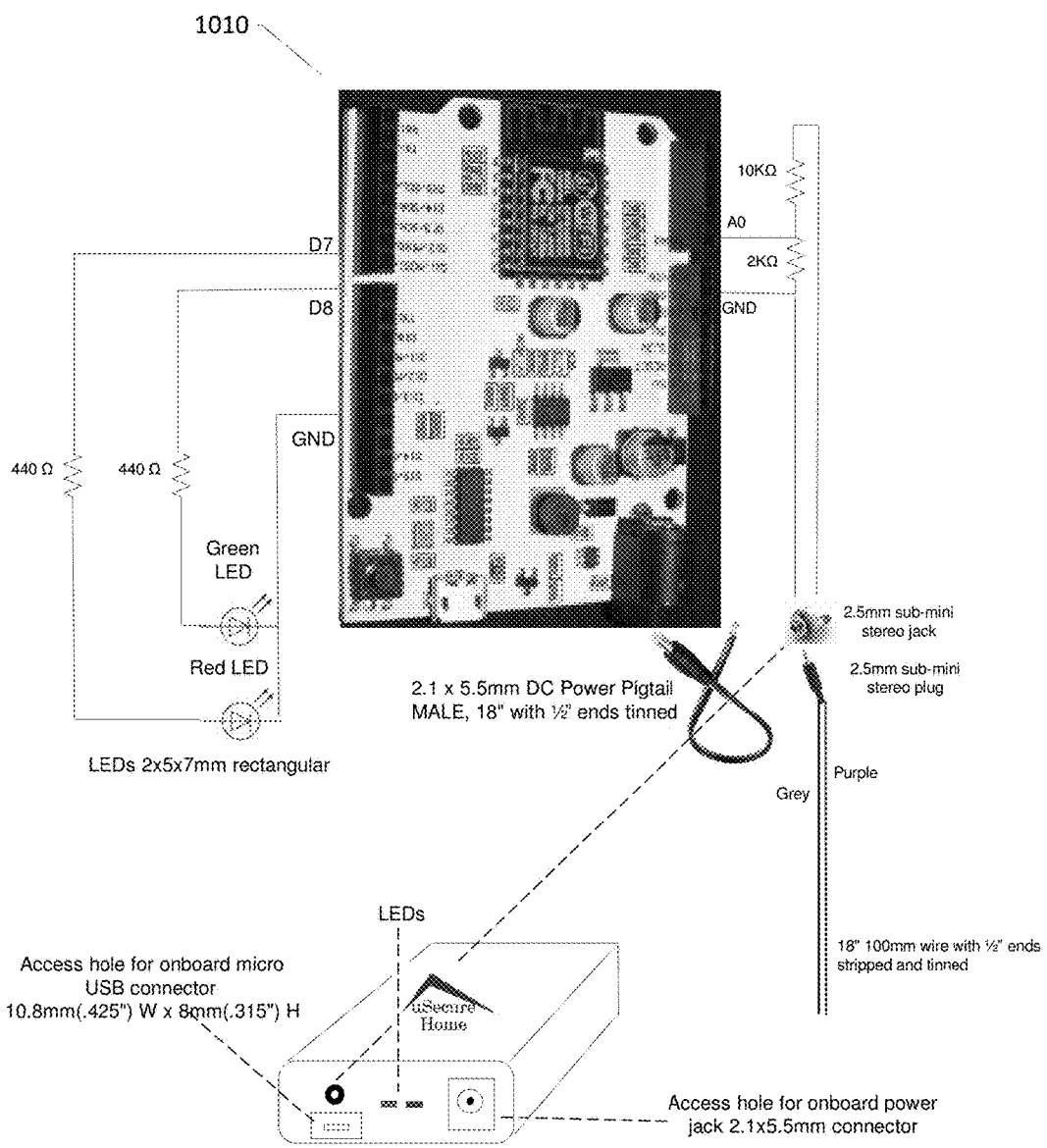
FIG. 10 illustrates an exemplary circuit board implementations of a security monitoring system.

Referring to FIG. 10, an illustration of an embodiment of a security monitoring system station is illustrated. The circuitry and processors of the system may be configured upon a circuit board as illustrated in circuit board 1010. In some examples, portions or all of the circuitry on a security monitoring system may be implemented in application specific integrated circuits which may dramatically decrease the form factor, power requirements, security aspects as well as other aspects of implemented security monitoring systems.

Referring to FIG. 11A an illustration of exemplary steps that may be performed by a user to set up a security monitoring systems is illustrated. At step 1, S1110, a user may be instructed and may implement making connections of required components to a security system. These connections may include making connections for a power source to connect to a security monitoring system base unit. As well, there may be connections that are made between the security system's alarm system and the security monitoring system base unit. Proceeding to step 2, S1120, the alarm and power cables may be connected to the security monitoring system base unit. At step 3, S1130, the security monitoring system's WiFi transmission node may be interconnected to various types of mobile devices. At step 4, S1140 a means of viewing system status through mobile devices or internet connected devices may be established by the user. The connection to the user mobile device may allow the user to access information about the security monitoring system settings including a unique identifier of the unit which may be called a "ChipID." This unique identifier may be used to register the system with external systems such as the proprietary server systems.

Figure 11B:
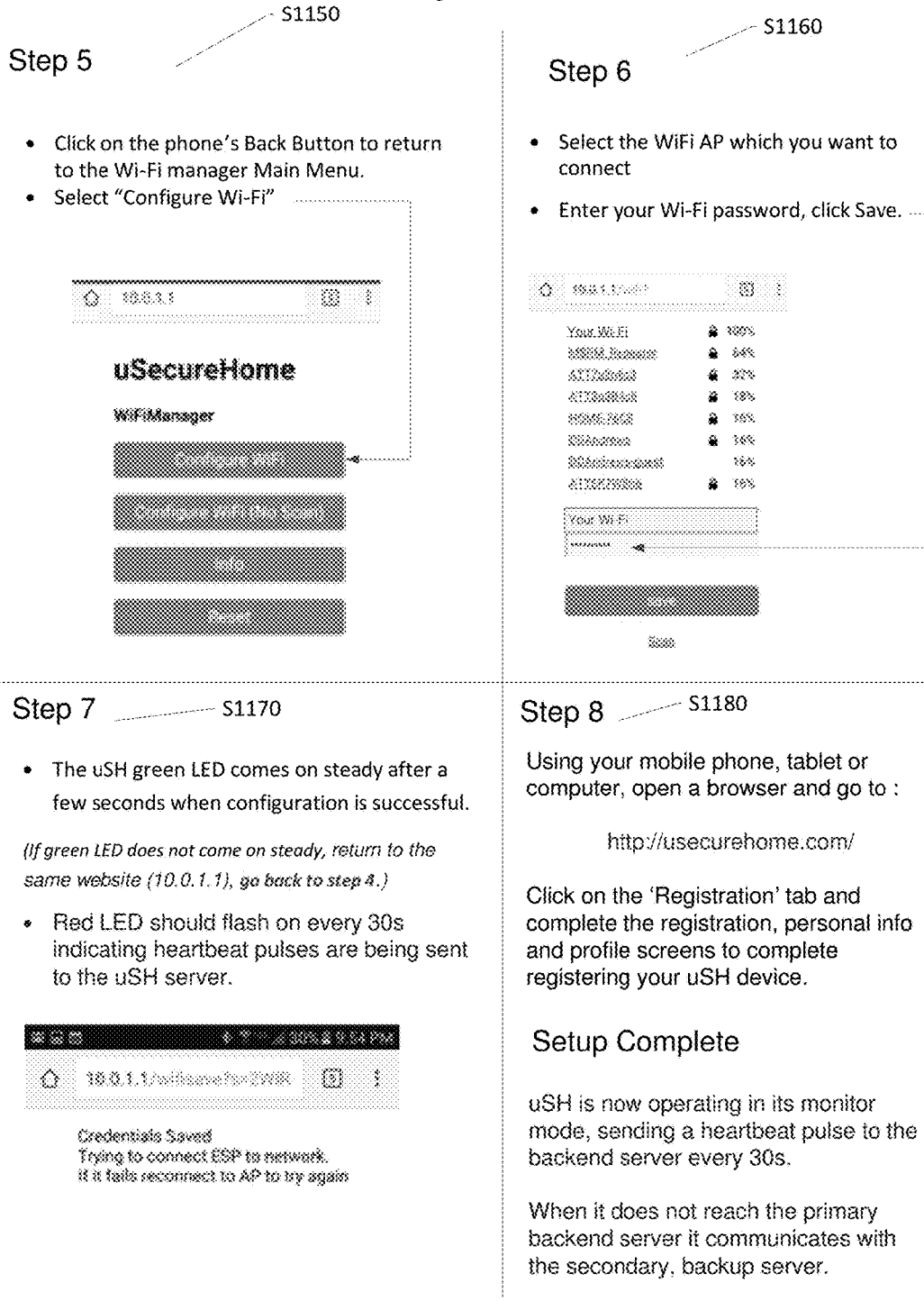

Proceeding to FIG. 11B, the process may continue. At step 5, 51150, the viewing system may be used to establish links to various types internet connections. The user may choose to configure WIFI connections. Then at step 6, S1160, the user may make a connection to the internet through various types of connections that may include routers, telecommunication devices, hot spots and the like. At step 7, S1170, feedback may be provided to the user. In some examples, LEDs or displays of various kinds may indicate to the user that a valid connection to the WiFi system has been made. At step 8, S1180, the user may use a mobile device connected to the security monitoring system to register the security monitoring system unit to the security monitoring processors. The registration may be made via such access as a web site of the security monitor provider.

Figure 12:
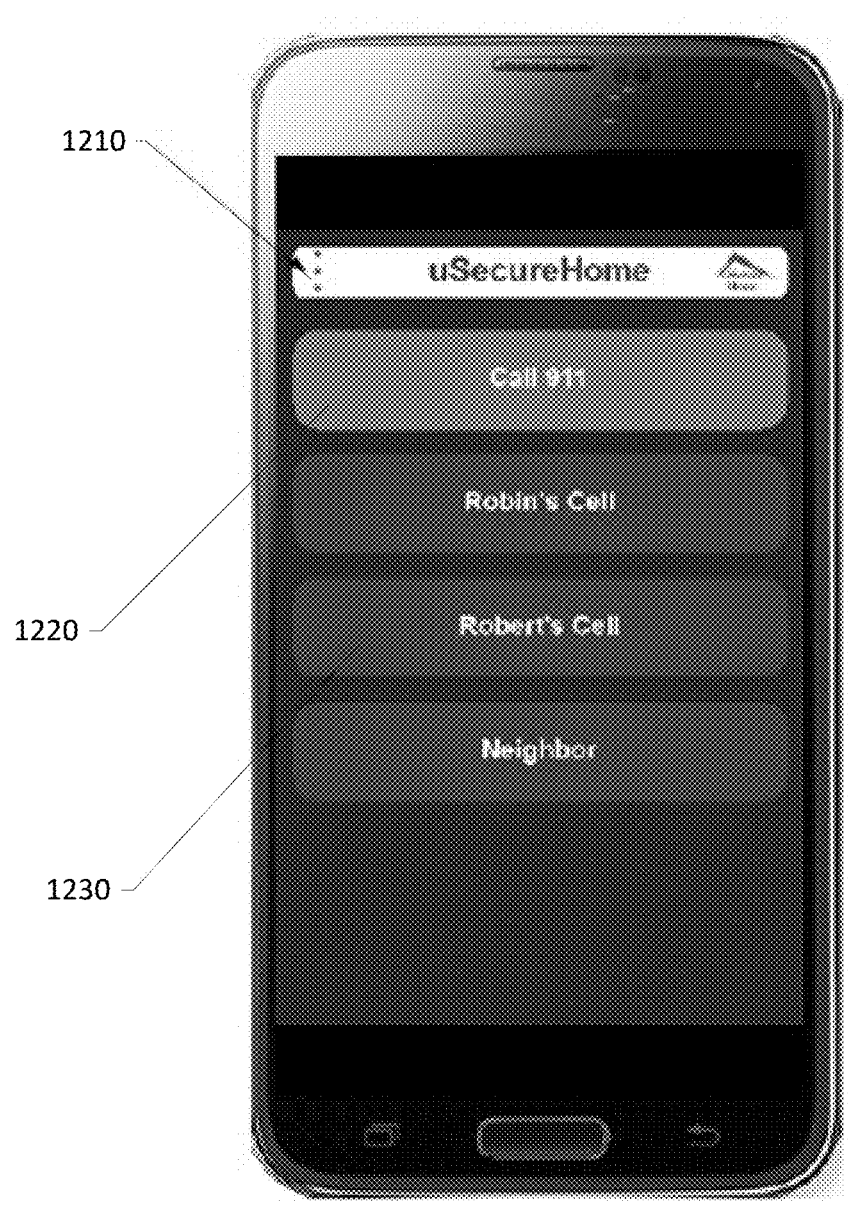
FIG. 12 illustrates an exemplary communication display for interactive communication in a security monitoring system.

Referring to FIG. 12, an exemplary mobile device display interface is provided. The security monitoring system mobile application may be designed to deliver expedited notifications to the user. For example, a message from a smartphone manufacturer or application store curator, such as Google or Apple, may cause the expedited notifications to display. In some examples, user defined speed dial buttons may be displayed on the main screen to allow the user to quickly react to an alarm condition such as a 911 connection 1220 or a phone connection to an individual 1230. The proprietary server may be designed to send out (2) levels of alerts: alarm and information. Examples of information alerts may include 'Loss of communications' and 'Communication restored'. Information alerts may not require a response action from the user. Alternatively, Alarm alerts may present a dialog box to the mobile user. This dialog may prompt the mobile user to choose "Take ownership" or "Pass on" the alert to various contacts. The user's response may be communicated back to the proprietary server for communication action based on a user's response or stored profile or both of these. A Toolbar 1210 may be provided in some examples to edit speed dial buttons for content such as title and phone number.

Figure 13:
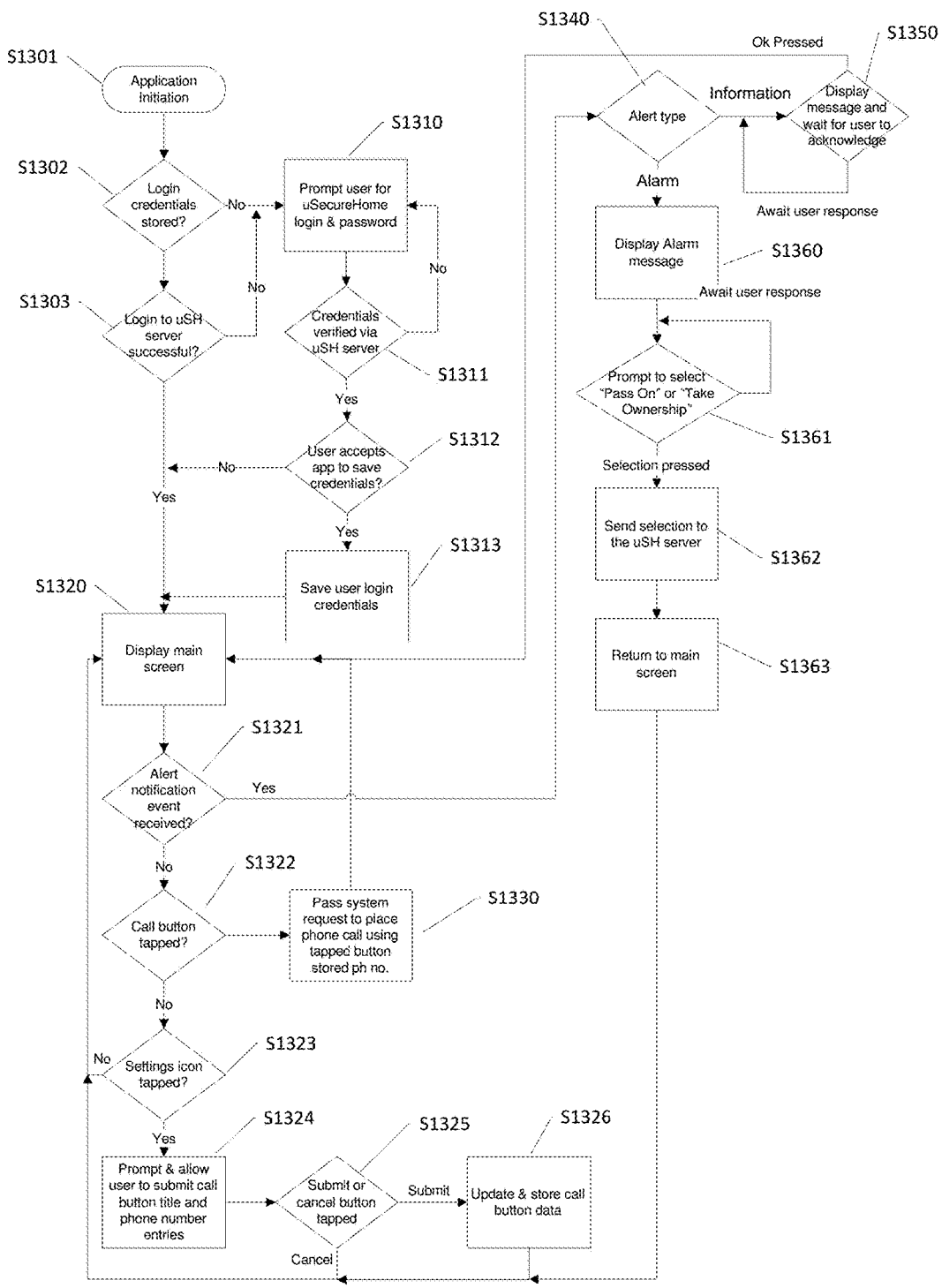
FIG. 13 illustrates an exemplary application (app) interface operational flowchart in a security monitoring system.

Referring to FIG. 13, an exemplary operational flow chart for an application based operation of a security monitoring system. At step S1301 the security monitoring system application is initiated. The system may then proceed to step S1302 where the system acts based upon the presence of stored login credentials. If there are no login credentials stored the system proceeds to step S1310 to prompt a user for the proprietary server login and password information. If however there are stored login credentials the system proceeds to step S1303 to attempt login to the proprietary server. If that is not successful, the operation will flow again to step S1310 to prompt for login and password information. Next the application may proceed to step S1311 where the credentials are verified by the server. If they are not verified as correct the flow will return to step S1310. If they are verified then the application may proceed to query the user whether to store the login credentials S1312. At step S1313, if the user indicates that they would like to store the credentials then they are saved. All the paths of application now flow to step S1320 to display the main screen.

The application may now loop to await a number of actions. At step S1321 the system may determine if an alert notification has been received. If not, the loop may then proceed to step S1322 to determine if a call button has been tapped on a mobile device. If not, then the loop may then proceed to determine if a settings icon is tapped at step S1323. If the settings icon has not been tapped then the loop returns to step S1320 to begin the same loop.

If the answer at step S1321 was that an alert notification event has been received then the system proceeds to process the notification event details. The exemplary system then proceeds to step S1340 to test what type of alert has been received. If the alert type is informational the system processing then proceeds to step S1350 to display the message and await a response from the user. The system may wait until it receives such a message, and when it receives the acknowledgement message, the system may return processing to step S1320 to display the main screen.

If the alert type is an alarm state then at step S1360 the system may display aspects of the alarm in a message. In some examples, the system may query the user as to whether they want to pass on the alarm or take ownership of processing after the alarm. The system may loop while awaiting one of the two responses from the user. In some examples, the answer to the question may be forwarded by the application process on to the proprietary server for further action at step S1362. Thereafter, at step S1363 the system may again return the system to the main menu step S1320.

If the answer at step S1322 was that a call button was tapped then a request to place a phone call using the store phone number associated with the tapped button will be passed to the system 51330. Thereafter, the processing flow will jump back to display the main screen at S1320.

If the answer at step S1323 was that the setting icon was tapped, then the system will prompt and allow the user to submit a call button title and phone number entry S1324. Thereafter, the system will query the user whether to submit or cancel the entry S1325. If the user responds to submit, the system will update and store call button data S1326. Thereafter, processing flow will jump to displaying the main screen S1320. However, if the user responds to cancel processing flow will divert to displaying the main screen as S1320.

In this example and other processing examples particular processing steps and flows have been outlined to provide examples of key aspects of the invention. There may be numerous alterations to this flow that may still be consistent with the invention including different order of the processing steps, added or removed processing steps to those that have been discussed and different types of looping, branching or interruption of the processing flow. Particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed invention.

Figure 14:
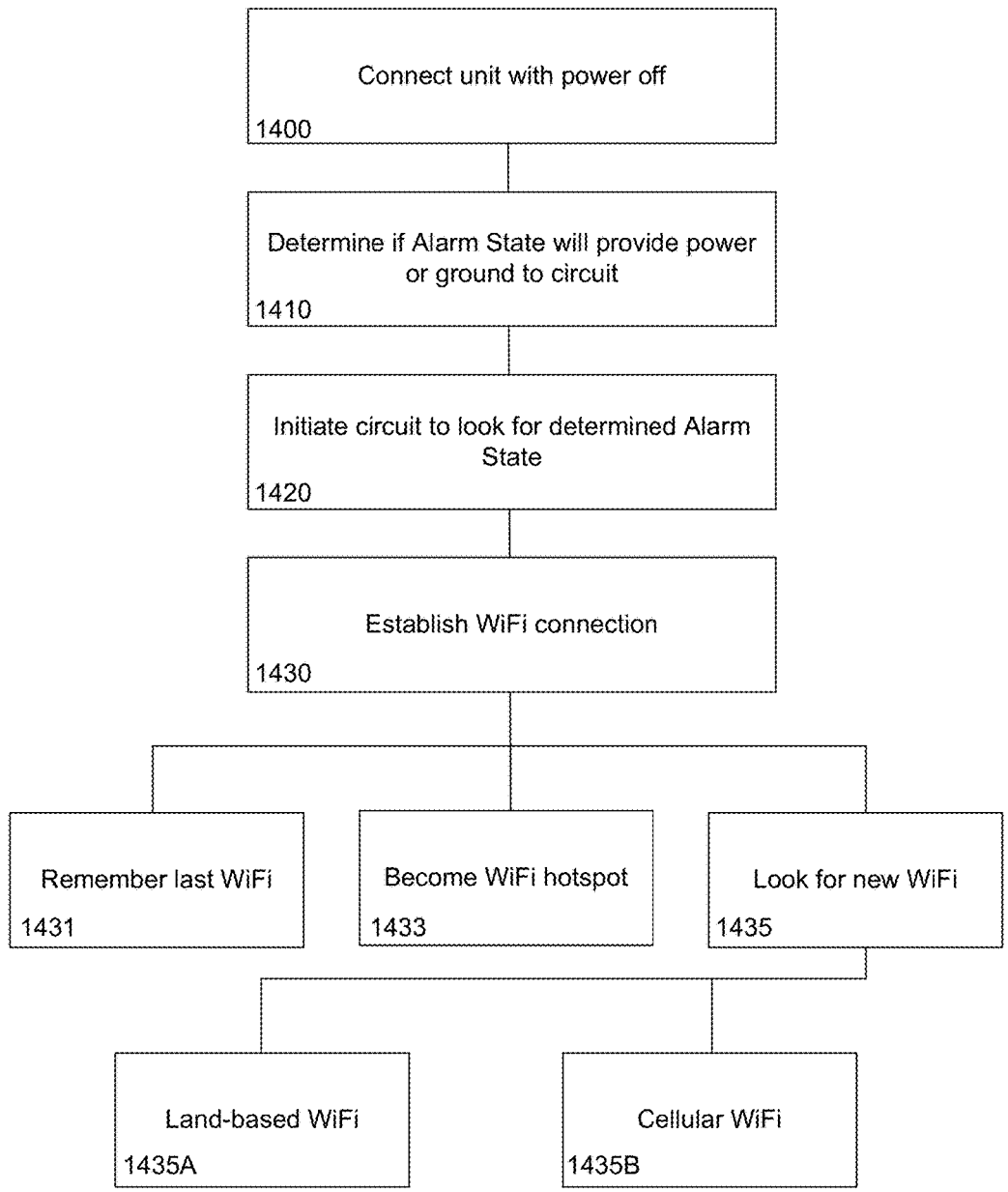
FIG. 14 illustrates a method of setting up the security system

Referring now to FIG. 14, an exemplary method of setting up the security system is shown. The system includes a security unit. The security unit comprises a power toggle, a circuit as described above, and a network access device capable of being linked to an Internet network, such as through WiFi, Ethernet, ultra-wideband, etc. At 1400, the security unit is connected to a power outlet and an alarm linkup with the unit's power off. At 1410, it is determined whether the Alarm State of the security unit corresponds to power going through the circuit (as measured with a voltmeter, ammeter, or other such method), or to no power going through the circuit (i.e., the circuit is grounded).

At 1420, the circuit is initiated to look for an Alarm State, based on the voltage criteria described above. Additionally, at 1430, the security unit may be connected to local WiFi. Here, the security unit has at least three options. First, the security unit may remember the last WiFi to which it was successfully connected (1431). Alternatively, if there is no last WiFi, or if the last WiFi connection does not work, then the unit may itself become a WiFi hotspot (1433). The unit may serve as a persistent WiFi hotspot, or it may be activated for the limited purpose of downloading necessary software and firmware to, at 1435, search for a new WiFi connection. In some embodiments, the new WiFi connection may be determined according to a hierarchical approach. For example, a land-based WiFi (1435A) may be prioritized over a cellular WiFi (1435B) signal of comparable strength and speed. The hierarchical approach may also be based on signal strength, signal speed, or other similar markers.

Figure 15:
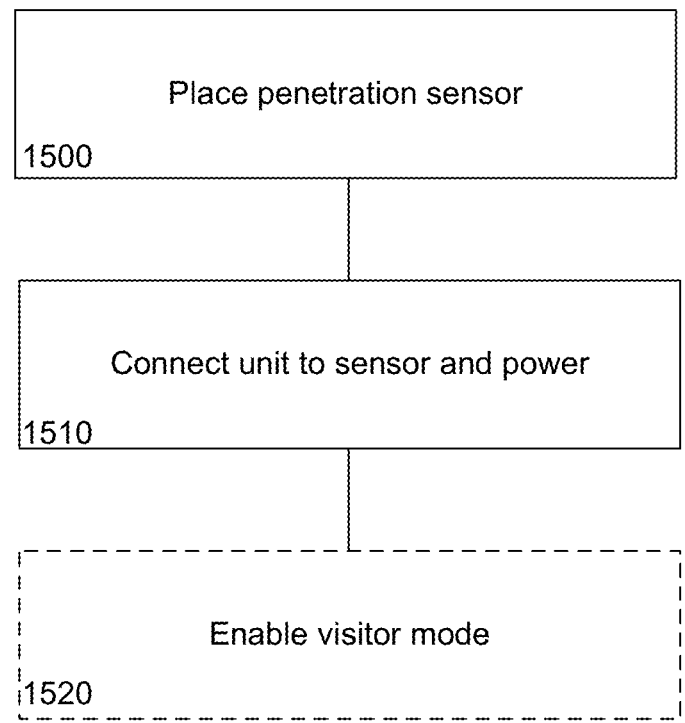
FIG. 15

Referring now to FIG. 15, a desirable method of using the security system is shown. An exemplary application of the above-described systems contemplates a situation in which a user (e.g., homeowner, property supervisor, etc.) has a previously installed alarm system that may not be connected to a monitoring service. Given the exorbitant costs of monitoring services (upwards of $30/month), the presently described system is capable of saving users significant amounts of money and endowing unused alarm systems with purpose. However, the present system is even more powerful than that. The user may wish to protect an area on an ad hoc basis. For example, a home may not have an installed alarm system. Alternatively, the home may be frequently entered by persons to whom the user does not want to give an alarm access code. This may include rented spaces, such as vacation rentals or Airbnb, or a real estate property that is periodically shown to potential buyers. The area to be protected may not even be a home; for example, a warehouse, a trade show space, the interior of a vehicle, a shipping container, a package, or luggage may be protected.

Accordingly, a method of using the security system on an ad hoc basis is shown in FIG. 15. At 1500, one or more penetration sensors are placed in desirable locations. For example, a sensor for detecting a door opening could be placed proximate to a door, or a window break sensor could be placed proximate to a window. At 1510, the one or more penetration sensors are connected to the security unit. The security unit as described has only one alarm input. However, it will be well understood by one schooled in the art that multiple penetration sensors can be linked in a series circuit so the alarm system could detect any change in voltage corresponding to a penetration at any of the sensors. (This may be further accomplished by, for example, using a type of field-effect transistor to monitor voltage drops below a threshold voltage.) At 1520, the application for the security unit is set up as described above. At 1530, a visitor mode may be activated on the application. The visitor mode may, for example, allow for the designation of a third party to receive alerts. In the case where the security unit is set up in a rental property, the application may send alerts to a phone number corresponding to the phone number of the anticipated visitor and may allow the visitor to have temporary control over the unit. (It may not be desirable for the rental owner to receive alerts each time the renter enters, but the rental owner may wish to know the first time the renter enters.) Alternatively, if the unit is set up in a real estate property to be sold, the unit may send alerts to a listing agent that someone is showing the property.

CONCLUSION

A number of embodiments of the present disclosure have been described. While this specification contains many specific implementation details, there should not be construed as limitations on the scope of any disclosures or of what may be claimed, but rather as descriptions of features specific to particular embodiments of the present disclosure.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A method of providing a series of user designated distributed responses based upon an alarm state, the method comprising;
    a. installing an alarm state connector comprising one or more penetration sensors;
    b. associating an analog alarm state with a universally unique identifier;
    c. connecting the alarm state connector to an alarm monitoring unit based on a determination of whether an alarm state will correspond to power to a circuit or grounding a circuit;
    d. monitoring the alarm state connector using the alarm monitoring unit;
    e. receiving a voltage indicative of an alarm state;
    f. recording a time and date of receipt of the voltage indicative of an alarm state; and
    g. checking for an availability of communication with a first server via hierarchical progression to an available communication modality;
        i. upon determination of availability of communication with the first server via a first communication modality, transmitting the universally unique identifier to the first server via the first communication modality with an indication of the alarm state;
        ii. accessing a geospatial location associated with the universally unique identifier;
        iii. upon determination of unavailability of communication with the first server via the first communication modality, checking for the availability of communication with the first server via a second communication modality;
        iv. upon determination of availability of communication with the first server via the second communication modality, transmitting the universally unique identifier to the first server via the second communication modality with an indication of the alarm state; and
        v. upon determination of unavailability of communication with the first server via the first communication modality and the second communication modality, transmitting the universally unique identifier to a second server with an indication of the alarm state.

2. The method of claim 1 additionally comprising the steps of:
    a. transmitting a request for a location of a first user mobile device associated with a first responder at a time of receipt of the voltage indicative of an alarm state an alarm state;
    b. receiving a Cartesian Coordinate of the first user mobile device;
    c. calculating a distance from the geospatial location associated with the universally unique identifier to the Cartesian Coordinate of the first user mobile device;

d. referencing a next action based upon the calculated distance from the geospatial location associated with the universally unique identifier to the Cartesian Coordinate of the first user mobile device; and
e. executing the next action based upon the calculated distance from the Cartesian Coordinate of the first user mobile device.

3. The method of claim 2 wherein the next action based upon the calculated distance from the geospatial location associated with the universally unique identifier to the Cartesian Coordinate of the first user mobile device comprises transmitting alarm state indicators to the first user mobile device.

4. The method of claim 3 additionally comprising the step of receiving a reset mechanism from the first user mobile device and resetting the alarm state based upon receipt of the reset mechanism.

5. The method of claim 4 additionally comprising the step of receiving a location of the first user mobile device at the time of receipt of the receiving the reset mechanism from the first user mobile device and storing a record indicative of the location of the first user mobile device at the time of receipt of receiving the reset mechanism.

6. The method of claim 2 wherein the next action based upon the calculated distance from the geospatial location associated with the universally unique identifier to the Cartesian Coordinate of the first user mobile device comprises determining a backup response contact.

7. The method of claim 6 wherein the step of determining a backup response contact comprises the steps of:
   a. receiving a Cartesian Coordinate of a second user mobile device; and
   b. calculating a distance from the geospatial location associated with the universally unique identifier to the Cartesian Coordinate of the second user mobile device.

8. The method of claim 6 additionally comprising the step of alerting emergency response personnel responsive to a geographical area including the geospatial location associated with the universally unique identifier.

9. The method of claim 8 comprising the step of placing one of the first responder and a second responder in communication with the emergency response personnel.

10. The method of claim 8 comprising the step of placing the first responder in communication with a second responder.

11. An automated apparatus for providing a series of user designated distributed responses based upon an alarm state, the apparatus comprising:
   a. a controller comprising a processor and a digital storage;
   b. programmable code residing in the digital storage and executable upon demand, the programmable code together with the controller being operative to:
   c. associate an analog alarm state with a universally unique identifier;
   d. determine whether an alarm state will correspond to power to a circuit or grounding a circuit;
   e. monitor an alarm state connector;
   f. receive a voltage indicative of an alarm state;
   g. record a time and date of receipt of the voltage indicative of an alarm state; and
   h. check for an availability of communication with a first server via hierarchical progression to an available communication modality;
      i. upon determination of availability of communication with the first server via a first communication modality, transmit the universally unique identifier to the first server via the first communication modality with an indication of the alarm state;
      ii. access a geospatial location associated with the universally unique identifier;
      iii. upon determination of unavailability of communication with the first server via the first communication modality, check for the availability of communication with the first server via a second communication modality;
      iv. upon determination of availability of communication with the first server via the second communication modality, transmit the universally unique identifier to the first server via the second communication modality with an indication of the alarm state; and
      v. upon determination of unavailability of communication with the first server via the first communication modality and the second communication modality, transmit the universally unique identifier to a second server with an indication of the alarm state.

12. The apparatus of claim 11 wherein the programmable code together with the controller is additionally operative to:
   a. transmit a request for a location of a first user mobile device associated with a first responder at a time of receipt of the voltage indicative of an alarm state an alarm state;
   b. receive a Cartesian Coordinate of the first user mobile device;
   c. calculating a distance from the geospatial location associated with the universally unique identifier to the Cartesian Coordinate of the first user mobile device;
   d. reference a next action based upon the calculated distance from the geospatial location associated with the universally unique identifier to the Cartesian Coordinate of the first user mobile device; and
   e. execute the next action based upon the calculated distance from the Cartesian Coordinate of the first user mobile device.

13. The apparatus of claim 12 wherein programmable code together with the controller is additionally operative to calculate distance from the geospatial location associated with the universally unique identifier to the Cartesian Coordinate of the first user mobile device comprises transmitting alarm state indicators to the first user mobile device.

14. The apparatus of claim 13 wherein the programmable code together with the controller is additionally operative to reset mechanism from the first user mobile device and resetting the alarm state based upon receipt of the reset mechanism.

15. The apparatus of claim 14 wherein the programmable code together with the controller is additionally operative to: receive a location of the first user mobile device at the time of receipt of the receiving the reset mechanism from the first user mobile device and store a record indicative of the location of the first user mobile device at the time of receipt of receiving the reset mechanism.

16. The apparatus of claim 12 wherein the next action based upon the calculated distance from the geospatial location associated with the universally unique identifier to the Cartesian Coordinate of the first user mobile device comprises determining a backup response contact.

17. The apparatus of claim 16 wherein determination of a backup response contact comprises:
   a. receiving a Cartesian Coordinate of a second user mobile device; and
   b. calculating a distance from the geospatial location associated with the universally unique identifier to the Cartesian Coordinate of the second user mobile device.

18. The apparatus of claim 16 wherein the programmable code together with the controller is additionally operative to alert emergency response personnel responsive to a geographical area including the geospatial location associated with the universally unique identifier.

19. The apparatus of claim 18 wherein the programmable code together with the controller is additionally operative to place one of the first responder and a second responder in communication with the emergency response personnel.

20. The apparatus of claim 18 wherein the programmable code together with the controller is additionally operative to place the first responder in communication with a second responder.

* * * * *